(12) United States Patent
Mizuno et al.

(10) Patent No.: US 11,785,112 B2
(45) Date of Patent: Oct. 10, 2023

(54) JOB EXECUTION SYSTEM, AND JOB EXECUTION METHOD

(71) Applicant: Hitachi, Ltd., Tokyo (JP)

(72) Inventors: Jun Mizuno, Tokyo (JP); Takahiro Sagara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 25 days.

(21) Appl. No.: 17/671,799

(22) Filed: Feb. 15, 2022

(65) Prior Publication Data
US 2022/0368769 A1 Nov. 17, 2022

(30) Foreign Application Priority Data

May 14, 2021 (JP) ................................. 2021-082830

(51) Int. Cl.
| | |
|---|---|
| *H04L 67/566* | (2022.01) |
| *H04L 67/01* | (2022.01) |
| *H04L 61/4511* | (2022.01) |
| *H04L 67/562* | (2022.01) |
| *H04L 61/5007* | (2022.01) |

(52) U.S. Cl.
CPC ........ *H04L 67/566* (2022.05); *H04L 61/4511* (2022.05); *H04L 67/01* (2022.05); *H04L 67/562* (2022.05); *H04L 61/5007* (2022.05)

(58) Field of Classification Search
CPC ... H04L 67/566; H04L 67/01; H04L 61/4511; H04L 67/562
See application file for complete search history.

(56) References Cited

U.S. PATENT DOCUMENTS

2015/0229638 A1\* 8/2015 Loo ..................... H04L 63/0853
726/11

FOREIGN PATENT DOCUMENTS

| JP | 2017-506387 A | 3/2017 | |
|---|---|---|---|
| WO | WO 2015/092876 A1 | 6/2015 | |
| WO | WO-2015092876 A1 \* | 6/2015 | ......... H04L 12/6418 |

\* cited by examiner

*Primary Examiner* — Suraj M Joshi
(74) *Attorney, Agent, or Firm* — Baker Botts L.L.P.

(57) ABSTRACT

It is made possible to realize bidirectional communication safely on the cloud side, and on-premises side in a job execution system.
It is checked whether or not there is an agent with the same logical name at time of agent registration. In a case that there is the same logical name, transfer performance required of each agent is checked, and communication is performed by rewriting a logical name during transfer by using an existing logical name for an agent required of the highest transfer performance, and using a logical name which is a new unique alias for the other agent.

14 Claims, 26 Drawing Sheets

OVERALL SYSTEM DIAGRAM

OVERALL SYSTEM DIAGRAM

FIG. 3

LOGICAL NAME MANAGEMENT TABLE ~2110

| LOGICAL NAME | HOSTNAME | CUSTOMER REGISTRATION IP ADDRESS | DNS REGISTRATION IP ADDRESS |
|---|---|---|---|
|  | AJSMANAGER 01 | – | 192.168.0.100 |
| AGENT 01 | AJSAGENT 01 | 192.168.0.10 | 192.168.1.100 |
| AGENT 02 | AJSAGENT 02 | 192.168.0.11 | 192.168.1.100 |

FLOWCHART OF AGENT REGISTRATION ~2210
PROCESS AT PORTAL SERVER

START
↓
RECEIVE AGENT REGISTRATION REQUEST —4010
↓
REGISTER, IN AGENT MANAGEMENT TABLE, AGENT NAME, HOSTNAME, AND IP ADDRESS INCLUDED IN REQUEST, AND REGISTER, IN DNS REGISTRATION IP ADDRESS, IP ADDRESS OF CLOUD-SIDE RELAY SERVER —4020
↓
END

AGENT REGISTRATION GUI OF PORTAL SERVER

FIG. 7

LOGICAL NAME MANAGEMENT TABLE ~6110

| LOGICAL NAME | IP ADDRESS |
|---|---|
| MANAGER 01 | 192.168.1.10 |
| AGENT 01 | 192.168.0.10 |
| AGENT 02 | 192.168.0.11 |

LOGICAL NAME MANAGEMENT TABLE ~ 9110

| LOGICAL NAME | IP ADDRESS |
|---|---|
| MANAGER 01 | 192.168.1.10 |
| AGENT 01 | 192.168.0.10 |
| AGENT 02 | 192.168.0.11 |

LOGICAL NAME MAPPING TABLE
(WITH SITE NAMES) @ PORTAL SERVER ~12000

| SITE NAME | OLD LOGICAL NAME | NEW LOGICAL NAME |
|---|---|---|
| CLOUD | MANAGER 01 | MANAGER 01 |
| TOKYO | AGENT 01 | TOKYO_AGENT 01 |
| TOKYO | AGENT 02 | TOKYO_AGENT 02 |
| OSAKA | AGENT 01 | OSAKA_AGENT 01 |
| OSAKA | AGENT 02 | OSAKA_AGENT 02 |

LOGICAL NAME MAPPING TABLE
(WITH SITE NAMES) @ CLOUD-SIDE RELAY SERVER ~15000

| SITE NAME | OLD LOGICAL NAME | NEW LOGICAL NAME |
|---|---|---|
| CLOUD | MANAGER 01 | MANAGER 01 |
| TOKYO | AGENT 01 | TOKYO_AGENT 01 |
| TOKYO | AGENT 02 | TOKYO_AGENT 02 |
| OSAKA | AGENT 01 | OSAKA_AGENT 01 |
| OSAKA | AGENT 02 | OSAKA_AGENT 02 |

LOGICAL NAME MAPPING TABLE 17000
(WITHOUT SITE NAMES) @ ON-PREMISES-SIDE
RELAY SERVER

| OLD LOGICAL NAME | NEW LOGICAL NAME |
|---|---|
| MANAGER 01 | MANAGER 01 |
| AGENT 01 | TOKYO_AGENT 01 |
| AGENT 02 | TOKYO_AGENT 02 |
| AGENT 01 | OSAKA_AGENT 01 |
| AGENT 02 | OSAKA_AGENT 02 |

REQUIRED PERFORMANCE MANAGEMENT TABLE @ PORTAL SERVER ~19000

| SITE NAME | AGENT LOGICAL NAME | REQUIRED PERFORMANCE (JOB COUNT/h) |
|---|---|---:|
| TOKYO | AGENT 01 | 30000 |
| TOKYO | AGENT 02 | 1000 |
| OSAKA | AGENT 01 | 500 |
| OSAKA | AGENT 02 | 20000 |

19010     19020     19030

PROCESS PERFORMED AT TIME OF AGENT REGISTRATION

PROCESS OF DETERMINING WHETHER TO LEAVE LOGICAL NAME UNCHANGED OR GIVE ALIAS DEPENDING ON REQUIRED PERFORMANCE

JOB NET SCHEDULE MANAGEMENT
TABLE @ PORTAL SERVER

| START TIME | JOB NET NAME |
|---|---|
|  |  |
|  |  |
|  |  |
|  |  |

JOB EXECUTION TIME MANAGEMENT
TABLE @ PORTAL SERVER

| EXECUTION AGENT LOGICAL NAME | JOB NAME | EXECUTION TIME |
|---|---|---|
|  |  |  |
|  |  |  |
|  |  |  |
|  |  |  |
|  |  |  |
|  |  |  |
|  |  |  |
|  |  |  |
|  |  |  |
|  |  |  |
|  |  |  |

25010     25020     25030

PROCESS OF PERFORMING ALIAS REGISTRATION FOR THE MOMENT, AND PERFORMING RENAMING LATER DURING TIME WHEN BOTH AGENTS ARE NOT PERFORMING JOB EXECUTION

JOB EXECUTION SYSTEM, AND JOB EXECUTION METHOD

BACKGROUND

The present invention relates to a job execution system, and a job execution method.

With the trend toward cloud lift, job schedulers are also required to be SaaS. In order to take over, and make existing products SaaS continuously, port release is necessary on the on-premises side where an agent is deployed. A VPN or a dedicated line can be a solution, but because a malicious SaaS manager can reach a customer server which is not required to be accessed, customers are hesitant for security-related reasons.

In one possible method as a solution to this, communication of a job scheduler is transferred by using a relay server connected to the cloud side from the on-premises side over WebSocket, GRPC or the like.

Japanese Unexamined Patent Application Publication (Translation of PCT Application) No. 2017-506387 discloses a method of transferring a request by connecting the cloud side, and the on-premises side over WebSocket.

In addition, agents of a job scheduler have the same logical names, and cannot be identified uniquely in a multi-on-premises environment in some cases, and a technique to perform communication from a manager to an agent securely even in a case that there are the same logical names is demanded.

WO2015/092876 discloses a method of enabling communication between hosts having the same names (virtual IP addresses) by setting dummy addresses for IP addresses included in the content of communication even if there are the same names.

SUMMARY

There is a problem about Japanese Unexamined Patent Application Publication (Translation of PCT Application) No. 2017-506387 that the transfer destination on the on-premises side is fixed, and it is not possible to determine the transfer destination agent in the case of a job scheduler where there are a plurality of agents.

In WO2015/092876, at each occasion, it is necessary to check whether there are the same IP addresses included in the communication content in communication being transferred, and to perform the process of setting dummy addresses if there are the same IP addresses. Accordingly, in a case that the technique is applied to SaaS of a job scheduler with a large job execution count, it is necessary to perform the process of checking whether or not there are changes of logical names, and changing logical names every time a job is executed, and this lowers transfer performance.

An object of the present invention is to make it possible to realize bidirectional communication safely on the cloud side, and on-premises side in a job execution system.

A job execution system according to one aspect of the present invention is a job execution system in which an on-premises side, and a cloud side are connected via the Internet, in which the on-premises side has: an on-premises-side DNS server that performs name resolution; at least one job execution server that executes a job; at least one job management agent server that gives an execution instruction about the job of the job execution server; and an on-premises-side relay server that transfers a job execution registration notification, a job start notification or a job completion notification, the cloud side has: a cloud-side DNS server that performs name resolution; a portal server that accepts agent registration or job net registration; a job management manager server that manages an execution schedule of the job, and transmits the job execution registration notification, the job start notification or the job completion notification to the job management agent server; and a cloud-side relay server that transfers the job execution registration notification, the job start notification or the job completion notification, at time of job execution registration: a connection is established between the on-premises-side relay server and the cloud-side relay server; the job management manager server changes name resolution at the cloud-side DNS server to thereby change communication directed to the job management agent server to communication directed to the cloud-side relay server, and transmit the job execution registration notification to the cloud-side relay server; the cloud-side relay server transfers the job execution registration notification to the on-premises-side relay server; and the on-premises-side relay server manages an agent IP address of the job management agent server, and transfers the job execution registration notification to the agent IP address, at time of job start, and job completion: a connection is established between the on-premises-side relay server and the cloud-side relay server; name resolution is changed at the on-premises-side DNS server to thereby change communication directed to the job management manager server to communication directed to the on-premises-side relay server, and transmit the job start notification, and job completion notification to the on-premises-side relay server; the on-premises-side relay server transfers the job start notification, and the job completion notification to the to the cloud-side relay server; and the cloud-side relay server manages a manager IP address of the job management manager server, and transfers the job start notification, and job completion notification to the manager IP address.

A job execution method of according to one aspect of the present invention is a job execution method for job execution via the Internet, the job execution method having: a step of setting an IP address of a cloud-side relay server to an IP address of a job management agent server in name resolution; a step of setting an IP address of an on-premises-side relay server to an IP address of a job management manager server; a step of setting a permanent connection environment in which a connection is established from the on-premises-side relay server to the cloud-side relay server; a step of choosing, at the cloud-side relay server, a logical name of the job management manager server included in a job execution start notification or a job execution completion notification, and an IP address of the job management manager server to be a transfer destination from a logical name management table; a step of transferring the job execution start notification or the job execution completion notification to the job management manager server; a step of choosing, at the on-premises-side relay server, the logical name of the job management agent server included in a job execution registration request, and an IP address of the job management agent server to be a transfer destination from the logical name management table; and a step of transferring the job execution registration request to the job management agent server.

According to one aspect of the present invention, it becomes possible to make it possible to realize bidirectional communication safely on the cloud side, and on-premises side in a job execution system.

BRIEF DESCRIPTION OF THE DRAWINGS

FIG. 3 is a configuration diagram of a logical name management table of the portal server.

FIG. 4 is a flowchart of an agent registration process at the portal server.

FIG. 7 is a configuration diagram of a logical name management table of the cloud-side relay server.

FIG. 10 is a configuration diagram of a logical name management table of the on-premises-side relay server.

FIG. 12 is a configuration diagram of a logical name mapping table of the portal server according to a second embodiment.

FIG. 15 is a configuration diagram of a logical name mapping table of the cloud-side relay server according to the second embodiment.

FIG. 17 is a configuration diagram of a logical name mapping table of the on-premises-side relay server according to the second embodiment.

FIG. 19 is a configuration diagram of a required performance management table of the portal server according to a third embodiment.

FIG. 24 is a configuration diagram of a job net schedule management table of the portal server according to a fourth embodiment.

FIG. 25 is a configuration diagram of a job execution time management table of the portal server according to the fourth embodiment.

DETAILED DESCRIPTION

Embodiments of the present invention are explained below by using the figures.

First Embodiment

Figure 1:
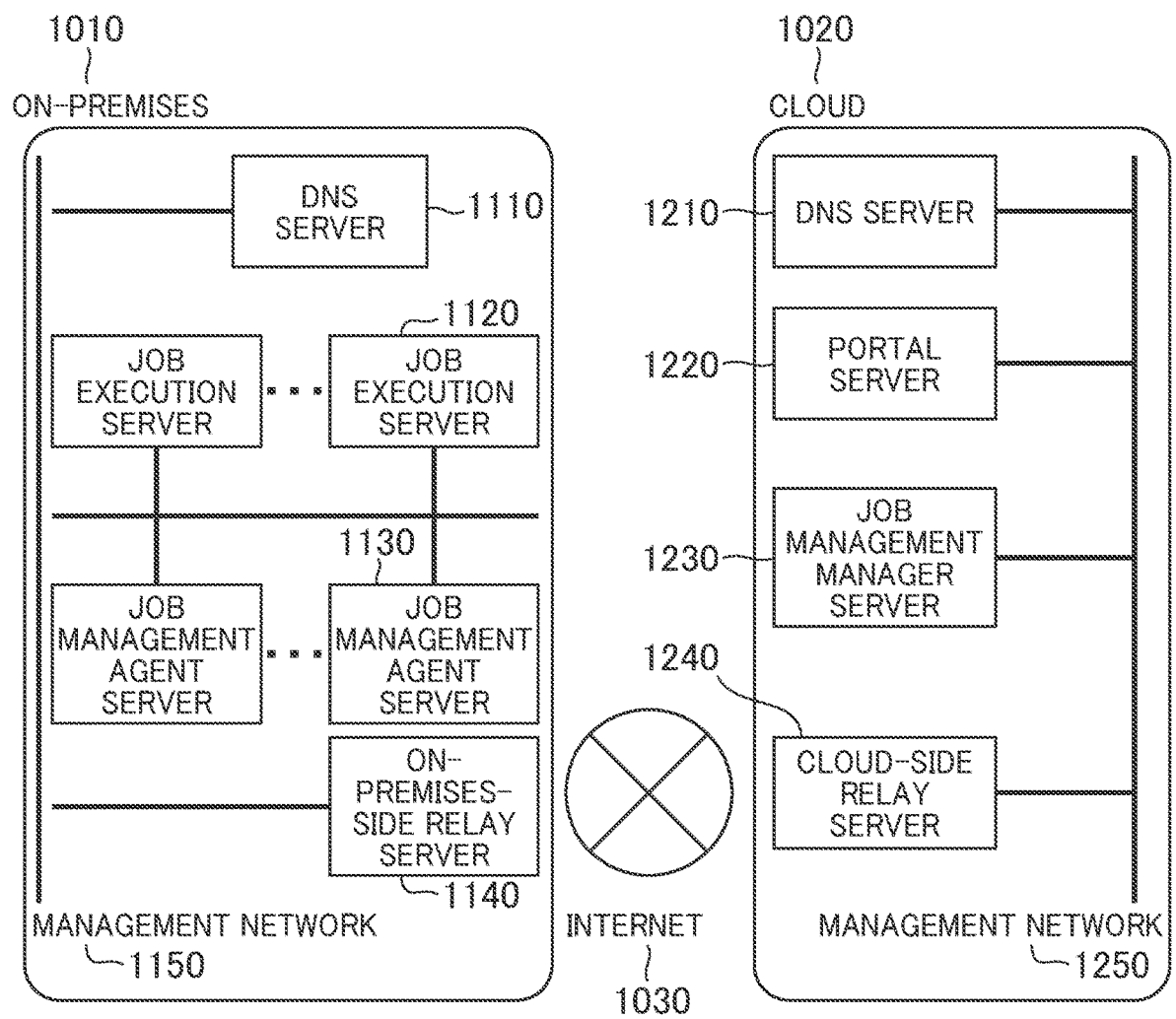
FIG. 1 is an overall overview diagram of a job scheduler system.

FIG. 1 is a schematic diagram of a job scheduler system to which a first embodiment of the present invention is applied.

As depicted in the figure, the job scheduler system according to the present first embodiment includes: a DNS server 1110 that performs name resolution; at least one job execution server 1120 that executes jobs; at least one job management agent server 1130 that gives execution instructions about jobs of the job execution server; and an on-premises-side relay server 1140 that transfers a job execution registration request, a job execution start notification, and a job execution completion notification. The DNS server 1110, the at least one job execution server 1120, the at least one job management agent server 1130, and the on-premises-side relay server 1140 are installed at on-premises 1010. The DNS server 1110, the job execution server 1120, the job management agent server 1130, and the on-premises-side relay server 1140 are connected by a management network 1150.

A DNS server 1210 that performs name resolution; a portal server 1220 that accepts agent registration or job net registration from an on-premises manager; a job management manager server 1230 that manages an execution schedule of a job net, and transmits a job execution registration request to the job management agent server 1130; and a cloud-side relay server 1240 that transfers a job execution registration request, a job execution start notification, and a job execution completion notification are installed on a cloud 1020. The DNS server 1210, the portal server 1220, the job management manager server 1230, and the cloud-side relay server 1240 are connected by a management network 1250.

The on-premises-side relay server 1140, and the cloud-side relay server 1240 are connected over the Internet 1030 according to protocols like WebSocket or gRPC that is connected from the on-premises-side relay server 1140.

Figure 2:
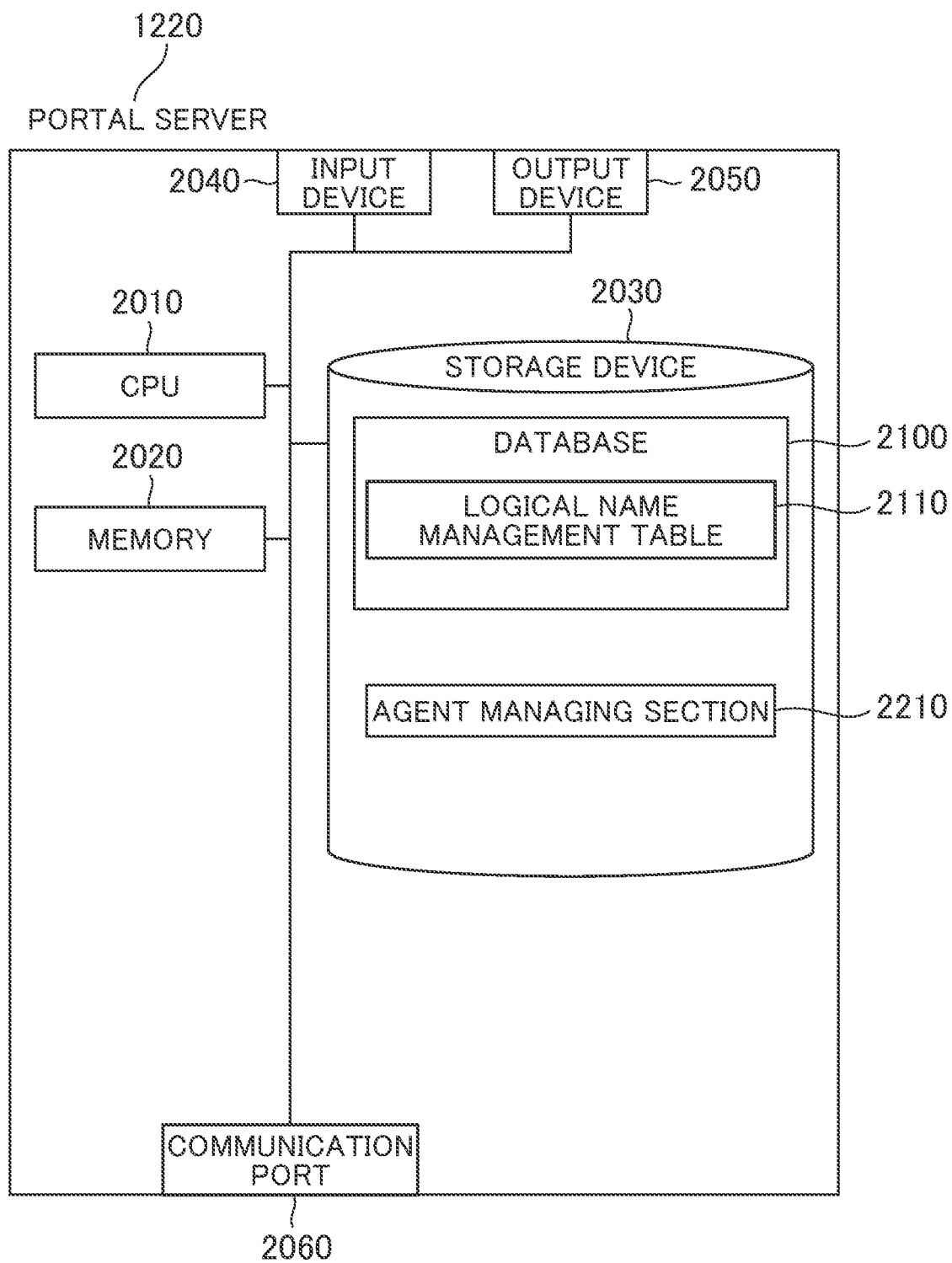
FIG. 2 is a configuration diagram of a portal server.

FIG. 2 is a figure depicting the configuration of the portal server 1220.

The portal server 1220 includes a CPU 2010, a memory 2020, a storage device 2030, an input device 2040, an output device 2050, and a communication port 2060.

The storage device 2030 retains a database 2100, and an agent managing section 2210 which are, at time of execution, executed by being loaded onto the memory 2020.

The database 2100 retains a logical name management table 2110 retaining logical names of job management manager servers, and job management agent servers.

The logical name management table 2110 is explained by using FIG. 3.

The logical name management table 2110 includes: fields of logical names 3010 retaining logical names of job management manager servers, and job management agent servers; fields of hostnames 3020 retaining hostnames of the job management manager servers, and the job management agent servers; fields of customer registration IP addresses 3030 retaining IP addresses registered by customers at time of agent registration; and fields of DNS registration IP addresses 3040 retaining IP addresses registered in a DNS server.

FIG. 4 is a flowchart depicting a process performed at the agent managing section 2210 at time of agent registration.

The agent managing section 2210 receives a request for agent registration from a customer (4010). The request for agent registration includes an agent logical name, a hostname, and an IP address.

The agent managing section 2210 stores the agent logical name, hostname, and IP address that are included in the request in a field of the logical names 3010, a field of the hostnames 3020, and a field of the customer registration IP addresses 3030, respectively, in the logical name management table 2110, and stores an IP address of the cloud-side relay server 1240 in a field of the DNS registration IP addresses (4020).

A process performed at the agent managing section 2210 at time of agent registration has been explained thus far.

Figure 5:
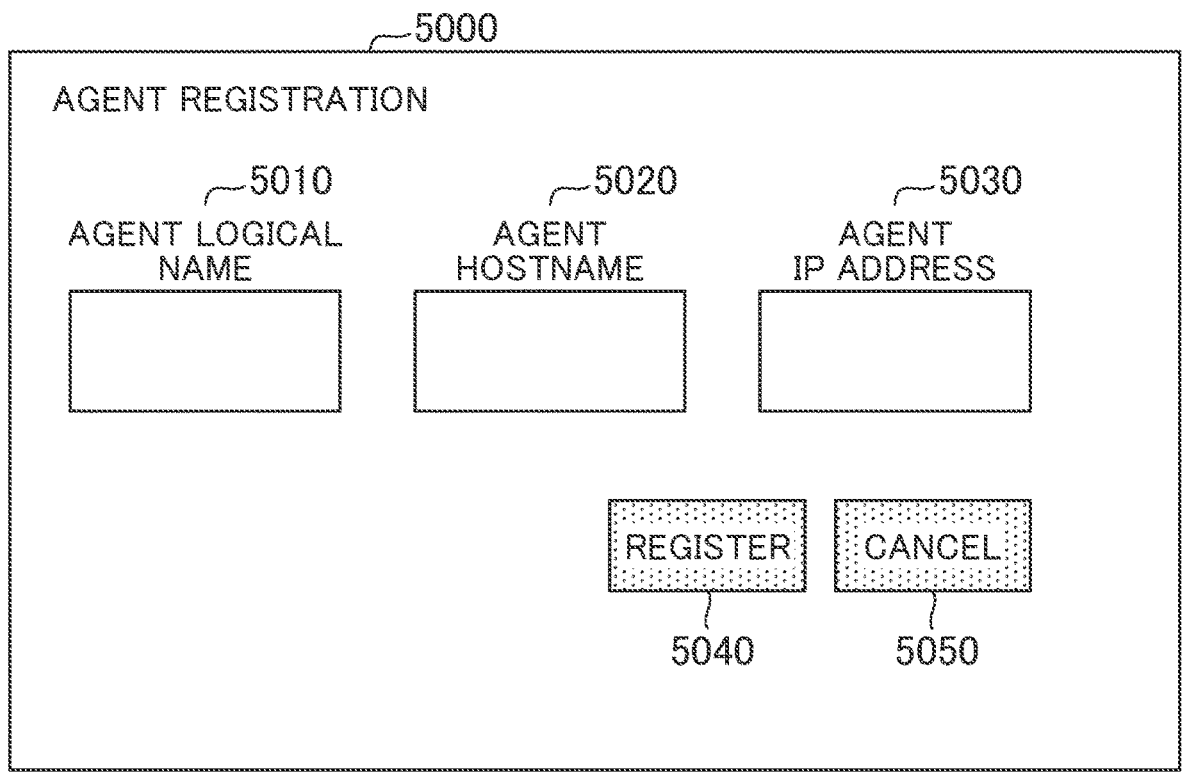
FIG. 5 depicts an agent registration GUI of the portal server.

FIG. 5 is an example of a GUI 5000 of an agent registration screen of the portal server.

The agent registration screen includes an agent logical name input form 5010 in which an agent logical name is input, an agent hostname input form 5020 in which an agent hostname is input, an agent IP address input form 5030 in which an agent IP address is input, a registration button 5040 for registering the agent in accordance with the input content, and a cancel button 5050 for cancelling input.

Figure 6:
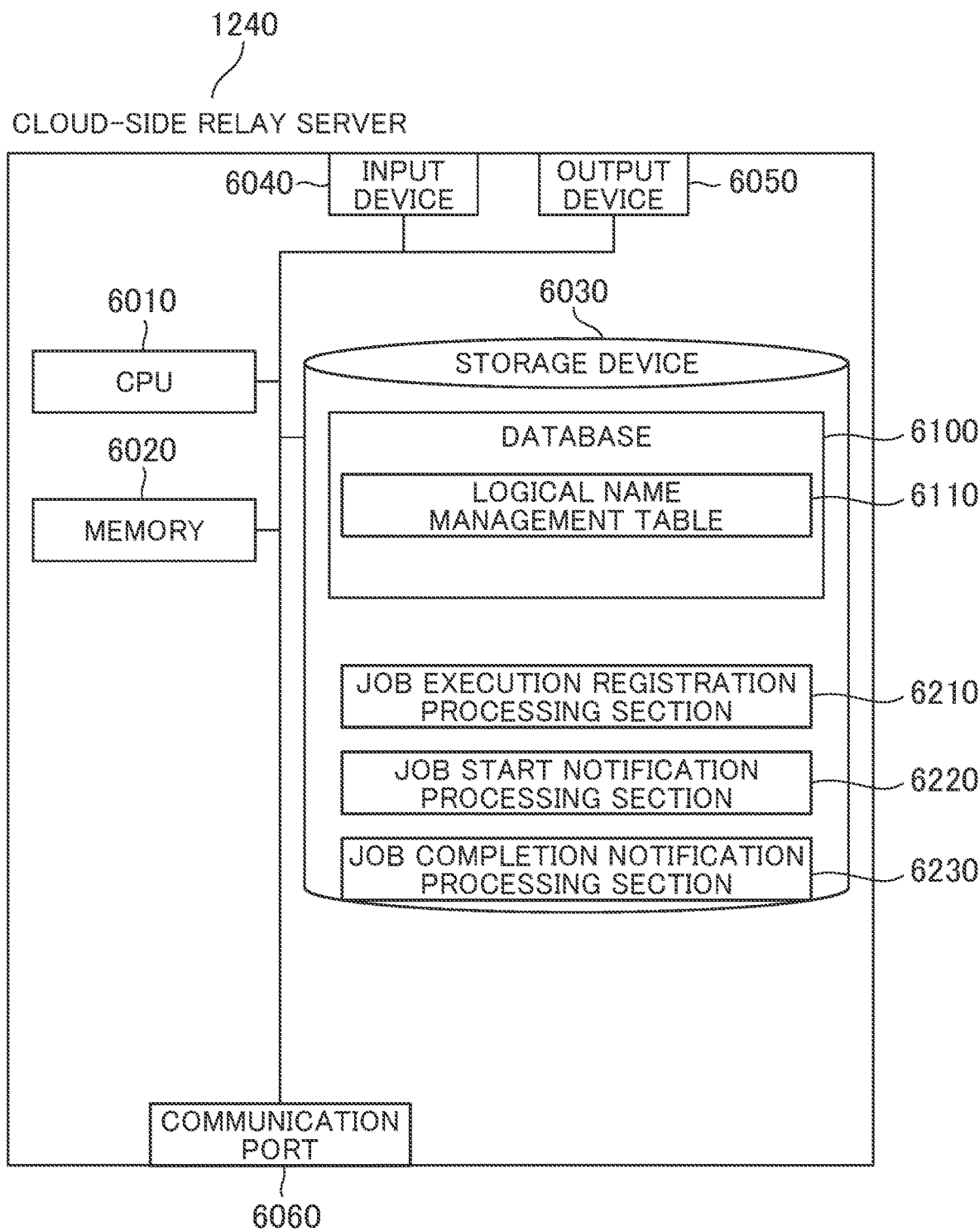
FIG. 6 is a configuration diagram of a cloud-side relay server.

FIG. 6 is a figure depicting the configuration of the cloud-side relay server 1240.

The cloud-side relay server 1240 includes a CPU 6010, a memory 6020, a storage device 6030, an input device 6040, an output device 6050, and a communication port 6060.

The storage device 6030 retains a database 6100, a job execution registration processing section 6210, a job start notification processing section 6220, and a job completion notification processing section 6230 which are, at time of execution, executed by being loaded onto the memory 6020.

The database 6100 retains a logical name management table 6110 retaining logical names of job management manager servers, and job management agent servers.

The logical name management table 6110 is explained by using FIG. 7.

The logical name management table 6110 includes fields of logical names 7010 retaining logical names of job management manager servers, and job management agent servers, and fields of IP addresses 7020 retaining actual IP addresses of the job management manager servers, and the job management agent servers.

Upon reception of a logical name, and a customer registration IP address from the portal server, the cloud-side relay server 1240 registers the logical name in a field of the logical names 7010, and the customer registration IP address in a field of the IP addresses 7020.

Upon reception of a job execution registration request from the job management manager server 1230, the job execution registration processing section 6210 transfers the job execution registration request to the on-premises-side relay server 1140 with no changes being made thereto.

Figure 8:
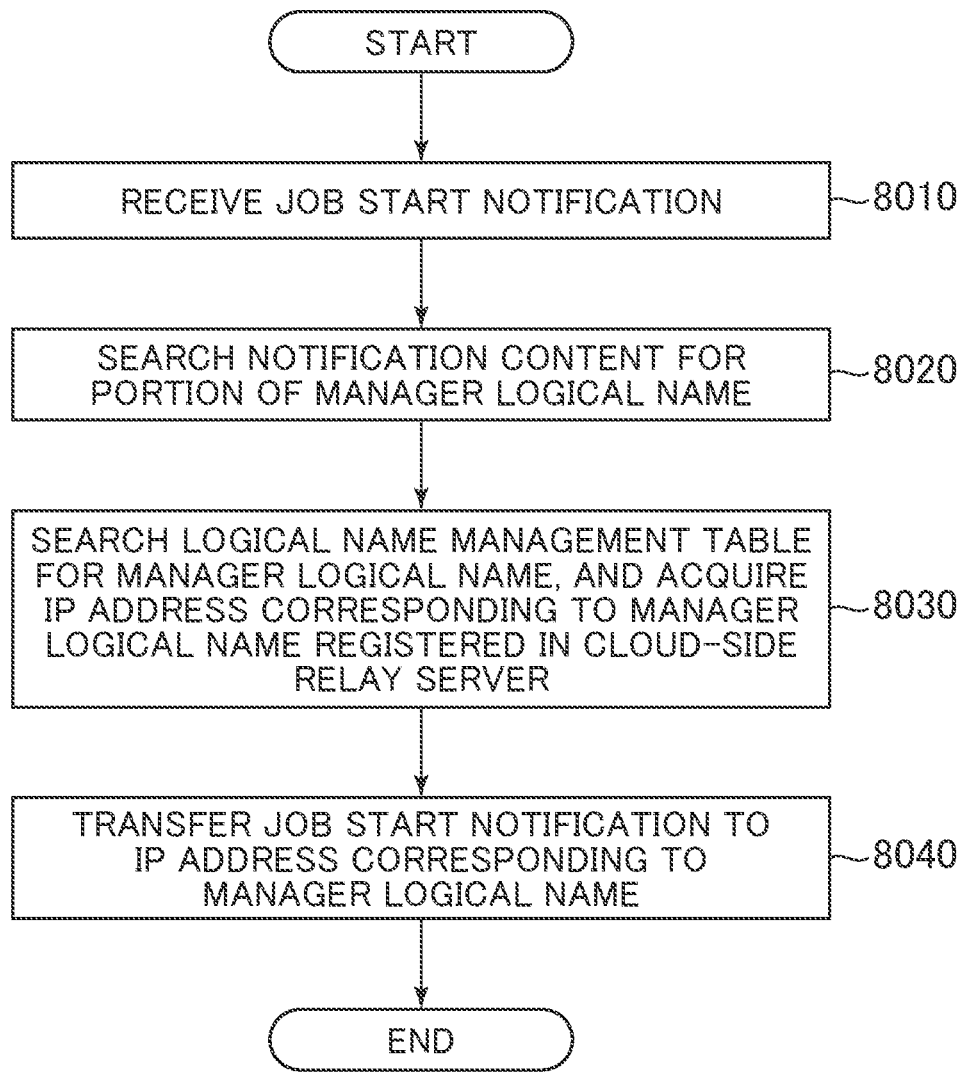
FIG. 8 is a flowchart of a job execution start notification processing section of the cloud-side relay server.

FIG. 8 is a flowchart depicting a process performed at the job start notification processing section 6220 when a job start notification is received from the on-premises-side relay server.

First, the job start notification processing section 6220 receives a job start notification from the on-premises-side relay server (8010).

Next, the notification content is searched for the portion of a manager logical name (8020).

Next, the logical name management table 6110 is searched for the manager logical name, and an IP address corresponding to the manager logical name is acquired (8030).

Last, the job start notification is transferred to the acquired IP address (8040).

A process performed at the job start notification processing section 6220 when a job start notification is received has been explained thus far.

The job completion notification processing section 6230 performs a process similar to the process at the job start notification processing section 6220. A difference is that while the job start notification processing section 6220 performs the process on a job start notification, the job completion notification processing section 6230 performs the process on a job completion notification.

Figure 9:
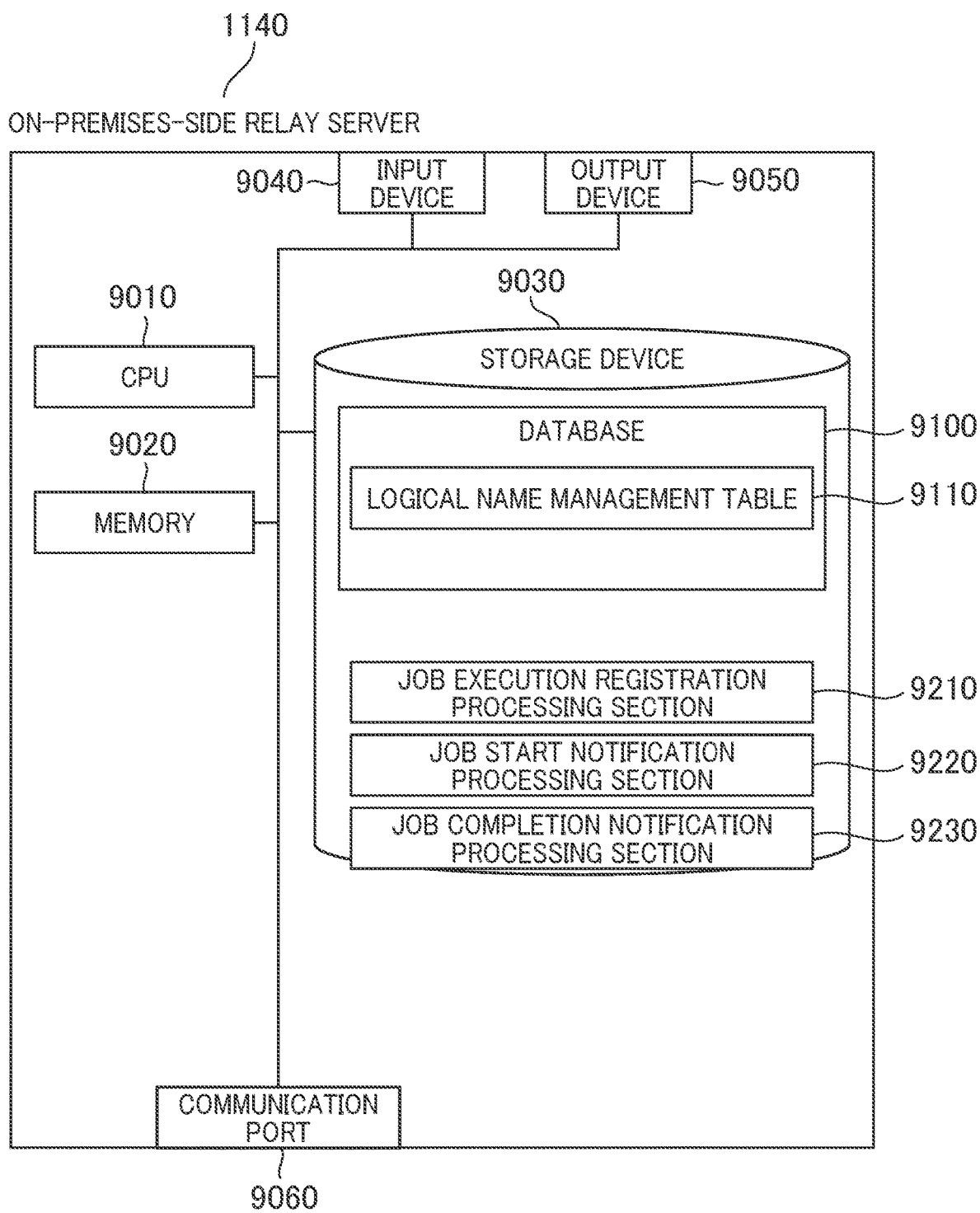
FIG. 9 is a configuration diagram of an on-premises-side relay server.

FIG. 9 is a figure depicting the configuration of the on-premises-side relay server 1140.

The on-premises-side relay server 1140 includes a CPU 9010, a memory 9020, a storage device 9030, an input device 9040, an output device 9050, and a communication port 9060.

The storage device 9030 retains a database 9100, a job execution registration processing section 9210, a job start notification processing section 9220, and a job completion notification processing section 9230 which are, at time of execution, executed by being loaded onto the memory 9020.

The database 9100 retains a logical name management table 9110 retaining logical names of job management manager servers, and job management agent servers.

The logical name management table 9110 is explained by using FIG. 10.

The logical name management table 9110 includes fields of logical names 10010 retaining logical names of job management manager servers, and job management agent servers, and fields of IP addresses 10020 retaining actual IP addresses of the job management manager servers, and the job management agent servers. Upon reception of a logical name, and an IP address from the cloud-side relay server, the on-premises-side relay server stores the logical name, and the IP address in the logical name management table 9110.

Figure 11:
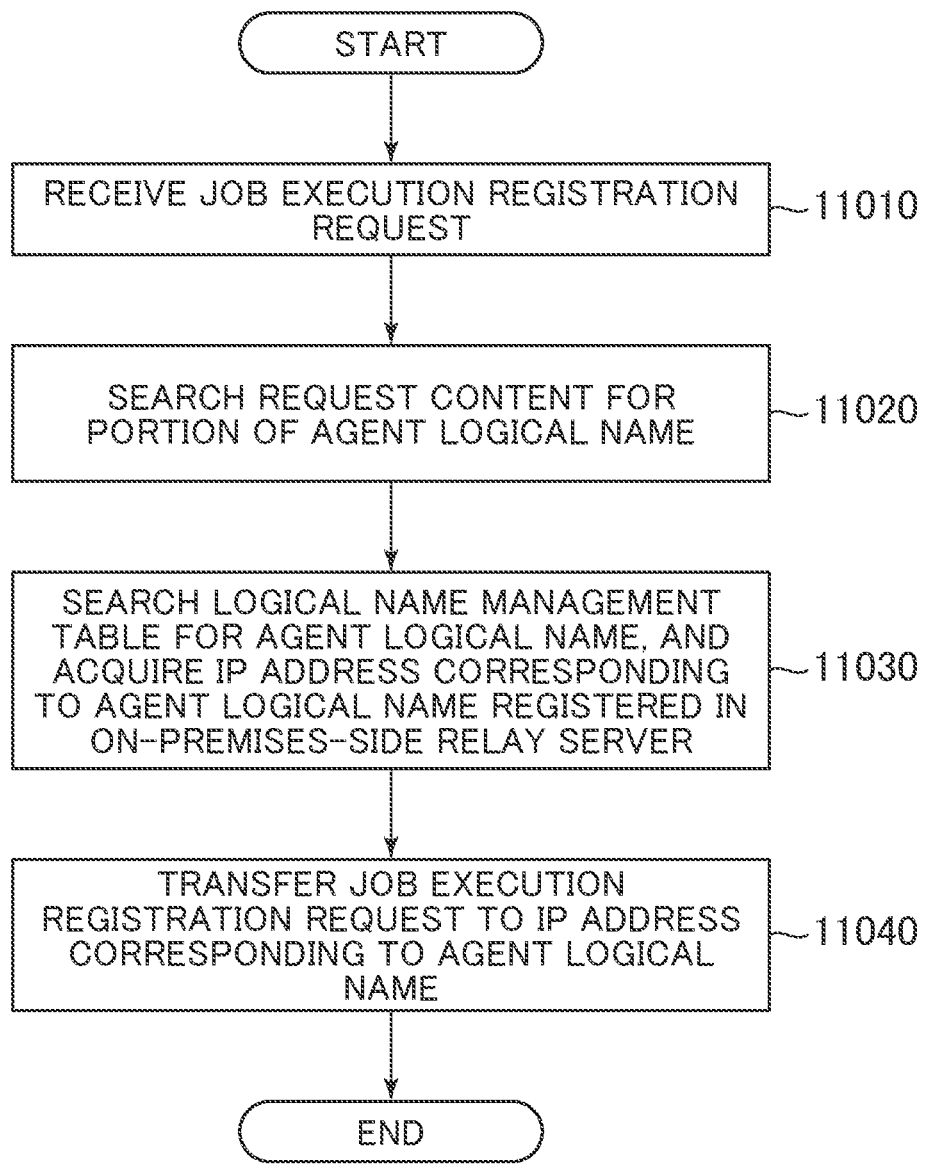
FIG. 11 is a flowchart of a job execution start notification processing section of the on-premises-side relay server.

FIG. 11 is a flowchart depicting a process performed at the job execution registration processing section 9210 when a job execution registration request is received from the cloud-side relay server.

First, the job execution registration processing section 9210 receives a job execution registration request from the cloud-side relay server (11010).

Next, the content of the request is searched for the portion of an agent logical name (11020).

Next, the logical name management table 9110 is searched for the agent logical name, and an IP address corresponding to the agent logical name is acquired (11030).

Last, the job execution registration request is transferred to the acquired IP address (11040).

A process performed at the job execution registration processing section 9210 when a job execution registration request is received has been explained thus far.

Upon reception of a job execution start notification from the job management agent server 1130, the job start notification processing section 9220 transfers the job execution start notification to the cloud-side relay server 1240 with no changes being made thereto.

Upon reception of a job execution completion notification from the job management agent server 1130, the job completion notification processing section 9230 transfers the job execution completion notification to the cloud-side relay server 1240 with no changes being made thereto.

According to the present first embodiment, a job execution registration request, a job execution start notification, and a job execution completion notification can be transferred securely by using the relay server over the Internet, and can be transferred to an appropriate agent or manager by checking an agent logical name or manager logical name. As a result, secure job execution over the Internet becomes possible.

Second Embodiment

The configuration of the job scheduler system according to the present second embodiment is almost similar to the first embodiment, but is different in that the portal server includes a logical name mapping table, and different processes are performed at time of agent registration, and at time of job net import. In addition, the configuration is different in that the cloud-side relay server includes a logical name mapping table, and the job execution registration processing section at the cloud-side relay server performs a different process. Furthermore, the configuration is different in that the on-premises-side relay server includes a logical name mapping table, and the job execution start notification processing section, and the job execution completion notification processing section perform different processes.

A logical name mapping table 12000 at the portal server 1220 is explained by using FIG. 12.

The logical name mapping table 12000 includes fields of site names 12010 retaining site names of on-premises environments, fields of old logical names 12020 retaining agent logical names that had been given at time of agent registration of customers, and fields of new logical names 12030 which are alias logical names given for registration in the job management manager server.

Figure 13:
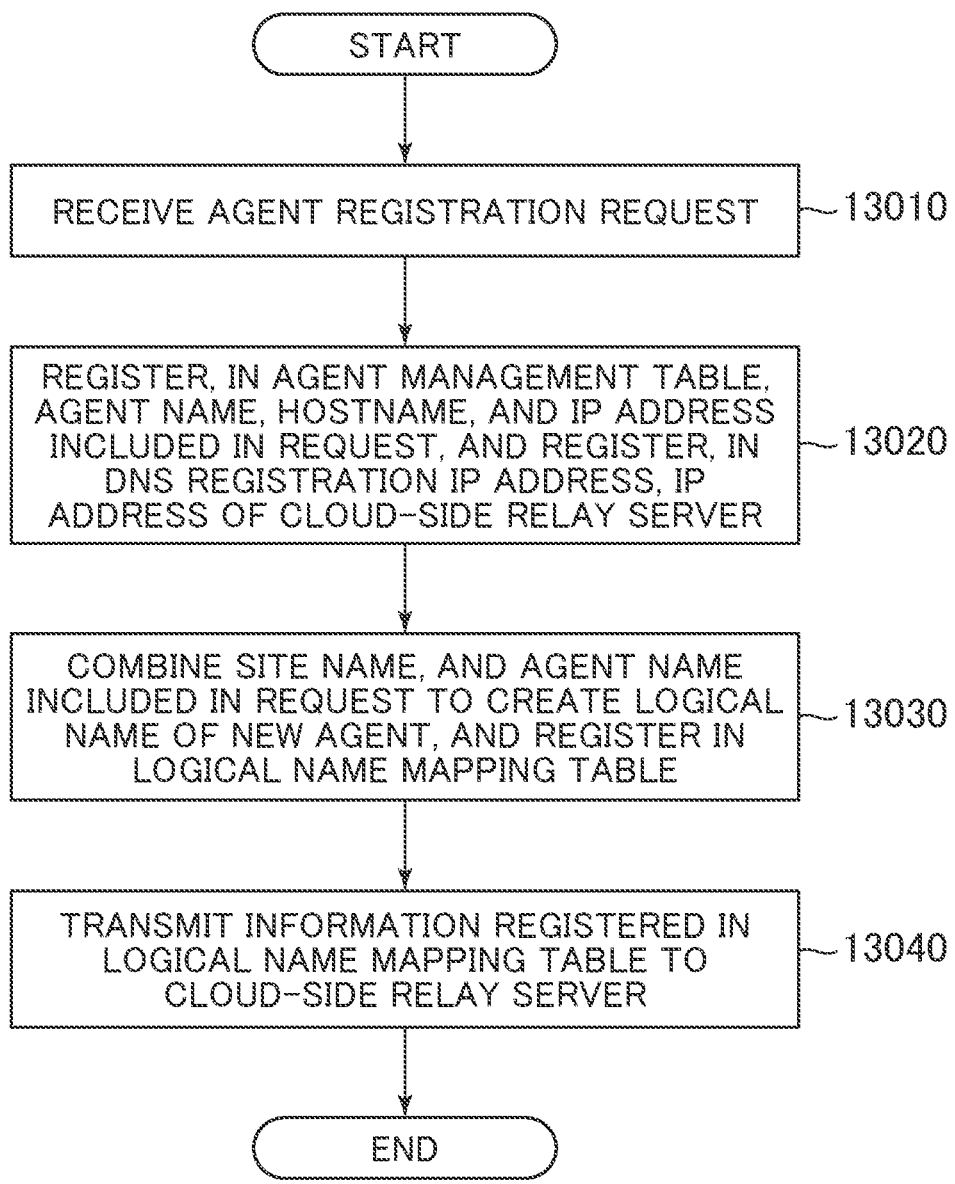
FIG. 13 is a flowchart of a process performed at the portal server at time of agent registration according to the second embodiment.

FIG. 13 is a flowchart depicting an agent registration process at the agent managing section 2210 at the portal server 1220.

An agent managing section 2210 receives an agent registration request from a customer (13010). The agent registration request includes a site name, an agent logical name, a hostname, and an IP address.

The agent managing section 2210 stores the agent logical name, hostname, and IP address that are included in the request in a field of the logical names 3010, a field of the hostnames 3020, and a field of the customer registration IP addresses 3030, respectively, in the logical name management table 2110, and stores an IP address of the cloud-side relay server 1240 in a field of the DNS registration IP addresses (13020).

Next, the site name, and agent name included in the request are combined to create a logical name of the new agent, and the logical names is registered in the logical name mapping table 12000 (13030).

Last, information registered in the logical name mapping table 12000 is transmitted to the cloud-side relay server 1240 (13040).

A process performed at the agent managing section 2210 at time of agent registration has been explained thus far.

Figure 14:
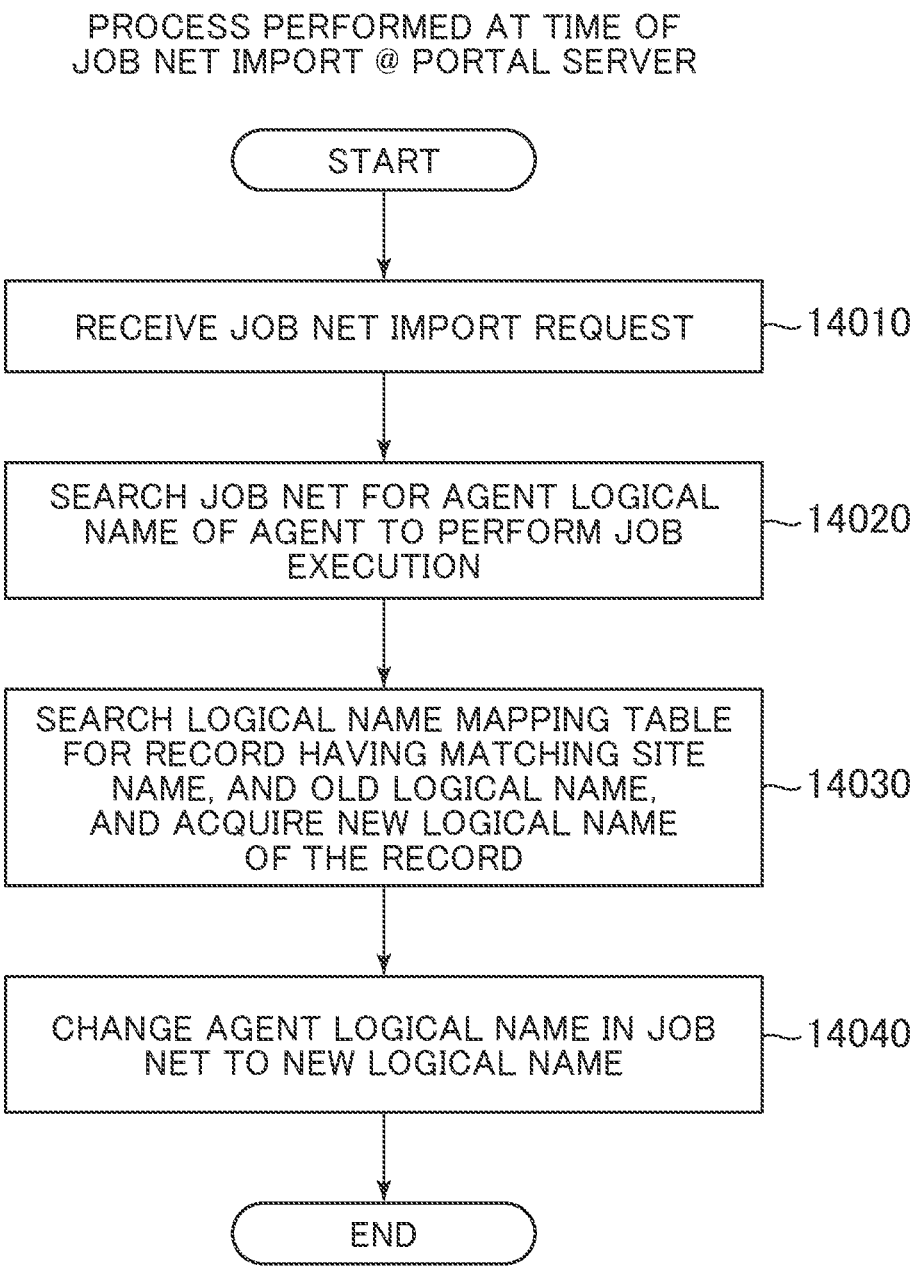
FIG. 14 is a flowchart of a process performed at the portal server at time of job net import according to the second embodiment.

FIG. 14 is a flowchart depicting a process performed at the agent managing section 2210 at the portal server 1220 at time of job net import.

The agent managing section 2210 receives a job net import request from a customer (14010).

Next, the agent managing section 2210 searches a job net to be imported, and acquires an agent logical name of an agent to execute a job (14020).

Next, the agent managing section 2210 searches the logical name mapping table 12000 for a record having a matching site name 12010, and old logical name 12020, and acquires a new logical name 12030 of the record (14030).

Last, the agent logical name in the job net is changed to the acquired new logical name (14040).

A process performed at the agent managing section 2210 at time of job net import has been explained thus far.

A logical name mapping table 15000 in the cloud-side relay server 1240 is explained by using FIG. 15.

The logical name mapping table 15000 includes fields of site names 15010 retaining site names of on-premises environments, fields of old logical names 15020 retaining agent logical names that had been given at time of agent registration of customers, and fields of new logical names 15030 which are alias logical names given for registration in the job management manager server.

Figure 16:
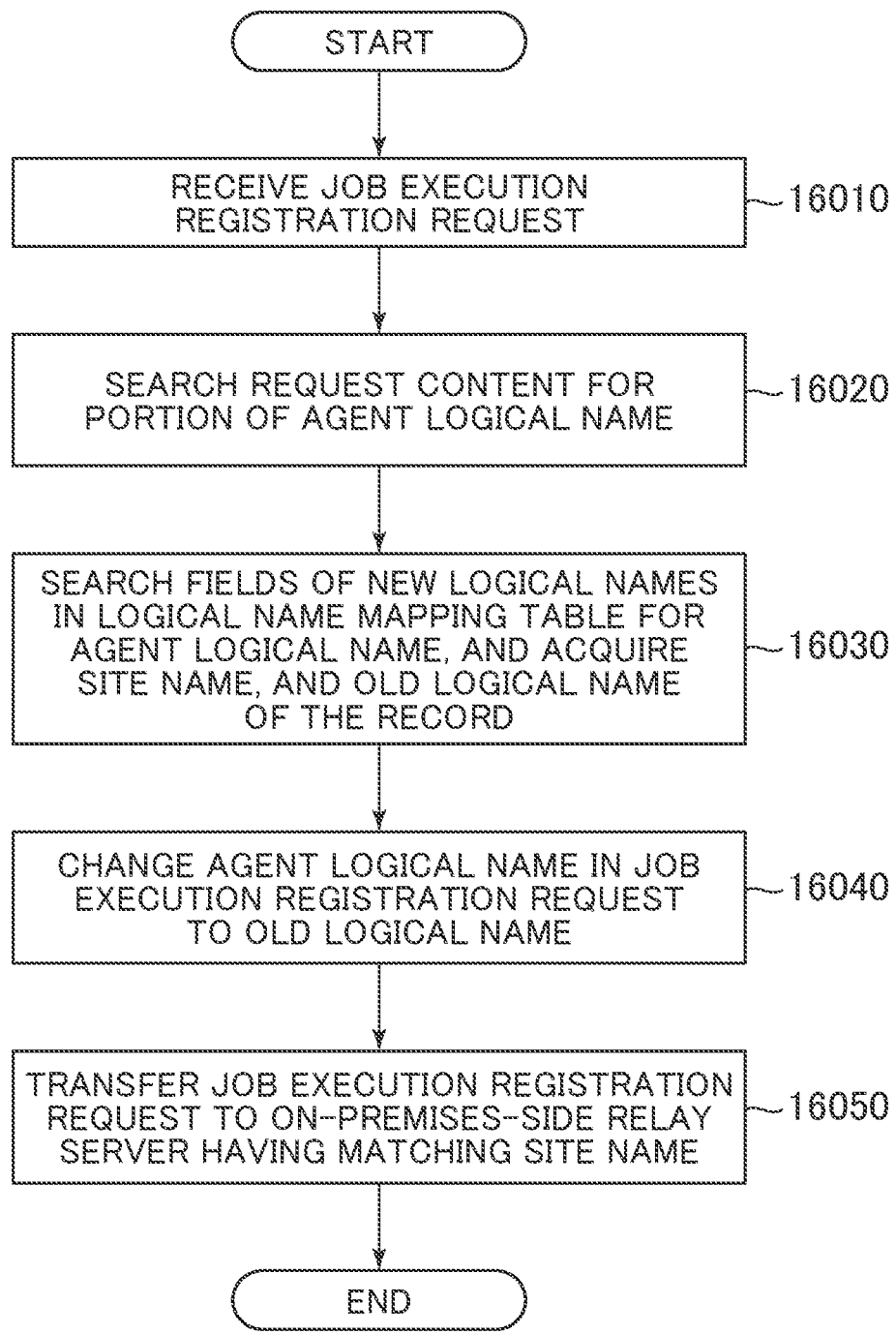
FIG. 16 is a flowchart of a job execution registration processing section of the cloud-side relay server according to the second embodiment.

FIG. 16 is a flowchart depicting a process performed at the job execution registration processing section 6210 of the cloud-side relay server 1240 at time of job execution registration request reception.

First, the job execution registration processing section 6210 receives a job execution registration request from the job management manager server 1230 (16010).

Next, the request content is searched for the portion of an agent logical name (16020).

Next, the fields of the new logical names 15030 of the logical name mapping table 15000 are searched for the agent logical name, and a site name 15010, and old logical name 15020 of the record are acquired (16030).

Next, the agent logical name in the job execution registration request is changed to the acquired old logical name (16040).

Last, the job execution registration request is transferred to the on-premises-side relay server 1140 having the matching site name (16050).

A process performed at the job execution registration processing section 6210 of the cloud-side relay server 1240 at time of job execution registration request reception has been explained thus far.

A logical name mapping table 17000 in the on-premises-side relay server 1140 is explained by using FIG. 17.

The logical name mapping table 17000 includes fields of old logical names 17010 retaining agent logical names that had been given at time of agent registration of customers, and fields of new logical names 17020 which are alias logical names given for registration in the job management manager server.

Figure 18:
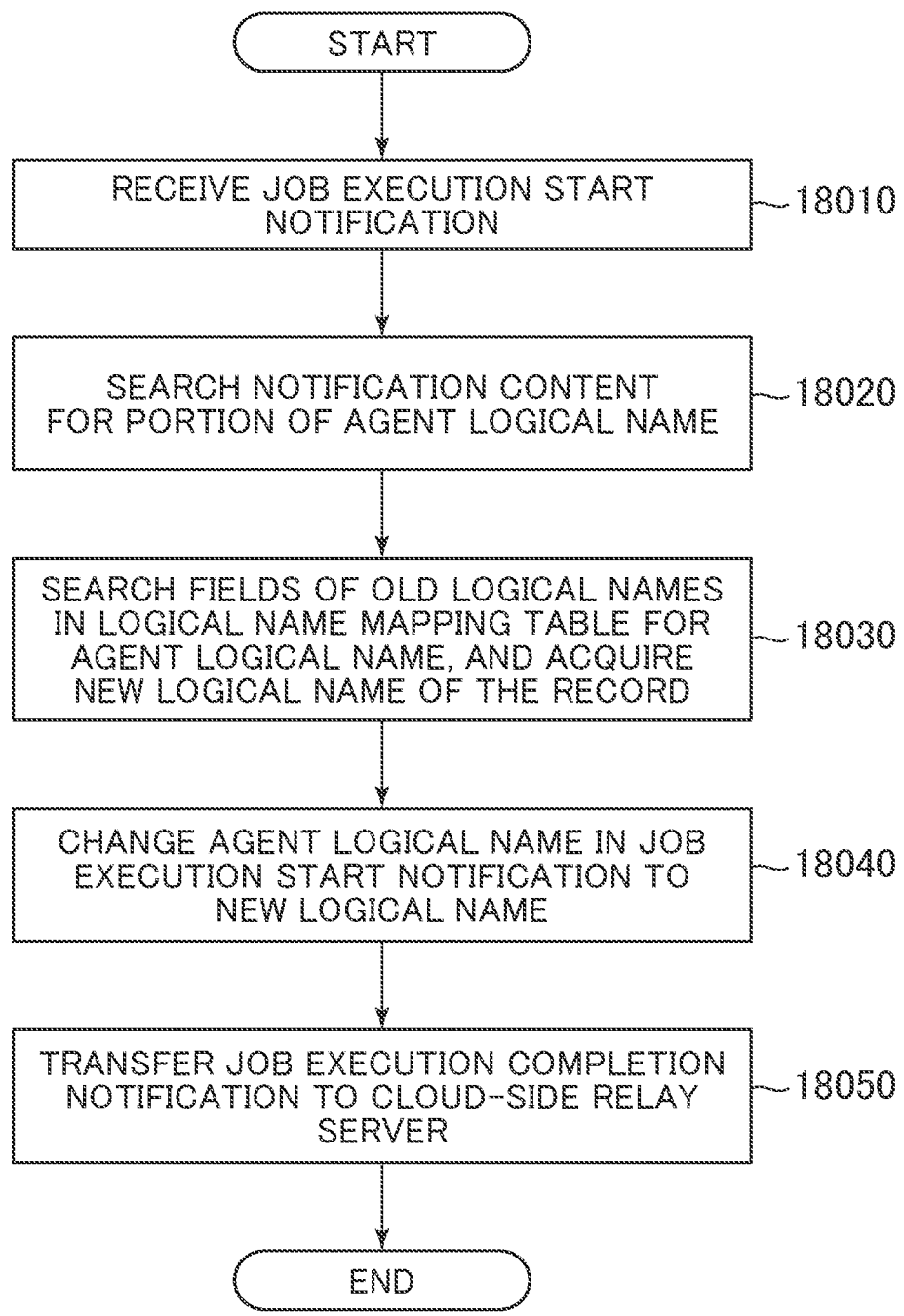
FIG. 18 is a flowchart of the job execution start notification processing section of the on-premises-side relay server according to the second embodiment.

FIG. 18 is a flowchart depicting a process performed at the job start notification processing section 9220 of the on-premises-side relay server 1140 at time of job execution start notification reception.

First, the job execution start notification processing section 9220 receives a job execution start notification from the job management agent server 1130 (18010).

Next, the request content is searched for the portion of an agent logical name (18020).

Next, the fields of the old logical names 17010 of the logical name mapping table 17000 are searched for the agent logical name, and a new logical name 17020 of the record is acquired (18030).

Next, the agent logical name in the job execution start notification is changed to the acquired new logical name (18040). Last, the job execution start notification is transferred to the cloud-side relay server 1240 (18050).

A process performed at the job execution start notification processing section 9220 of the on-premises-side relay server 1140 at time of job execution registration request reception has been explained thus far.

A process at the job execution completion notification processing section 9230 of the on-premises-side relay server 1140 is almost similar to operation of the job execution start notification processing section 9220, and the only difference is that the processed notification is whether a job execution start notification or a job execution completion notification.

According to the present second embodiment, in a multi-on-premises environment also, a job execution registration request, a job execution start notification, and a job execution completion notification can be transferred securely by using the relay server over the Internet, and can be transferred to an appropriate agent or manager by checking an agent logical name or manager logical name. As a result, secure job execution over the Internet becomes possible.

Third Embodiment

The configuration of the job scheduler system according to the present third embodiment is almost similar to the second embodiment, but is different in that the portal server includes a required performance management table, and a different process is performed at time of agent registration. In addition, the job execution registration processing section at the cloud-side relay server performs a different process. Furthermore, the job execution start notification processing section, and job execution completion notification processing section at the on-premises-side relay server perform different processes.

A required performance management table 19000 in the portal server 1220 is explained by using FIG. 19.

The required performance management table 19000 includes fields of site names 19010 retaining site names of on-premises environments, fields of agent logical names 19020 retaining agent logical names that had been given at time of agent registration of customers, and fields of required performance (job count/h) 19030 retaining transfer performance (job count/h) necessary for agents.

Figure 20:
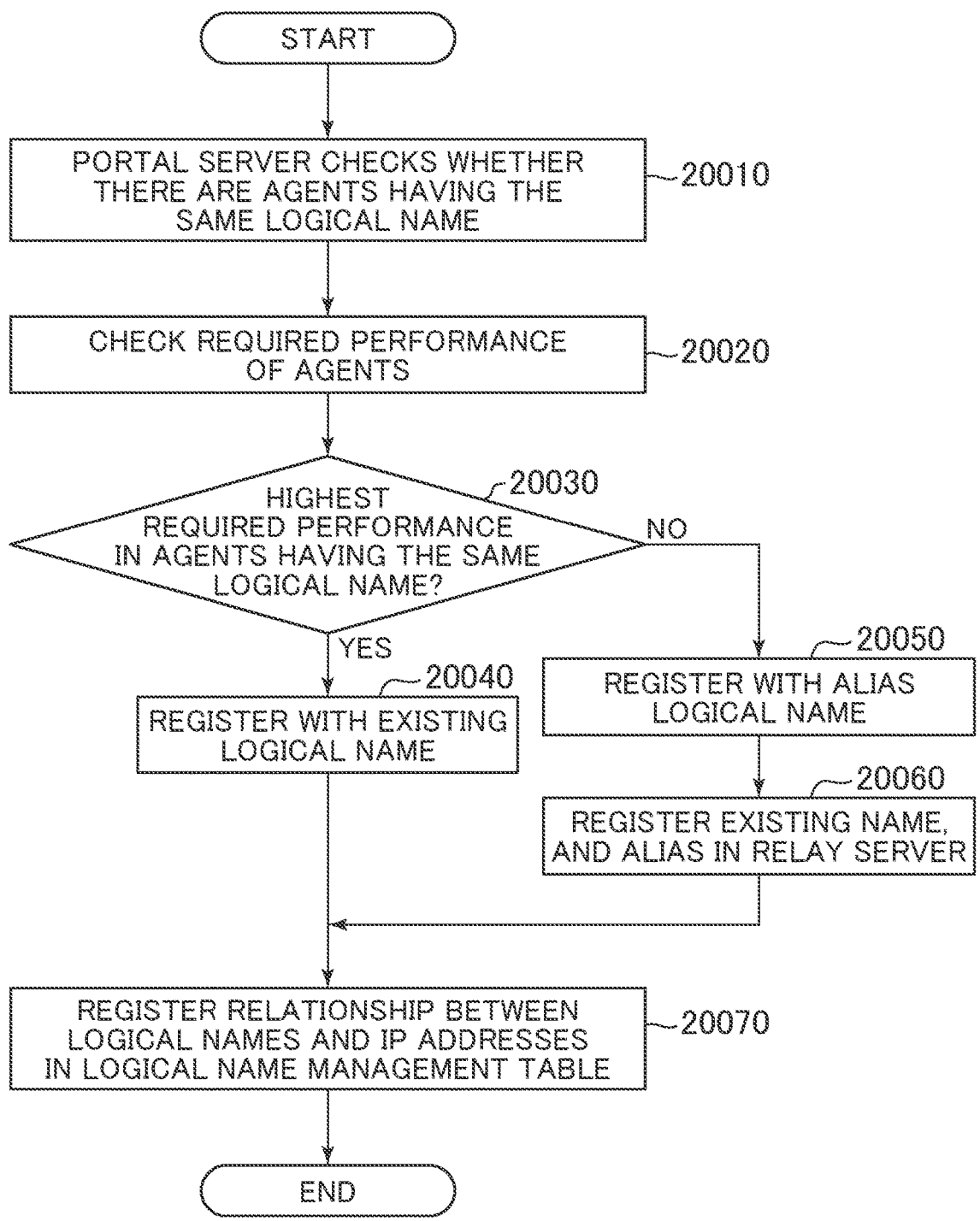
FIG. 20 is a flowchart of the agent registration process of the portal server according to the third embodiment.

FIG. 20 is a flowchart depicting the agent registration process at the agent managing section 2210 at the portal server 1220.

First, upon reception of an agent registration request from a customer, the agent managing section 2210 searches the logical name mapping table 12000 to check whether there is the same logical name, and proceeds to the next step if there is the same logical name (20010).

Next, the required performance management table 19000 is referred to, performance required of the agent is acquired in accordance with the agent logical name, and performance required of an agent having the same agent logical name is acquired (20020). An agent that is required of the highest performance of the acquired required performance is searched for (20030).

The agent that is required of the highest performance is registered under an old logical name (20040).

The following process is performed for an agent determined as not being required of the highest performance at 20030. A new logical name created by combining a site name, and an agent logical name is registered in the logical name mapping table 12000 (20050).

The agent logical name is registered as an old logical name, and the new logical name is registered as a new logical name in the cloud-side relay server 1240 (20060). Last, a relationship between the logical name and IP address is registered in the logical name management table 2110 (20070).

The agent registration process of the portal server 1220 has been explained thus far.

Figure 21:
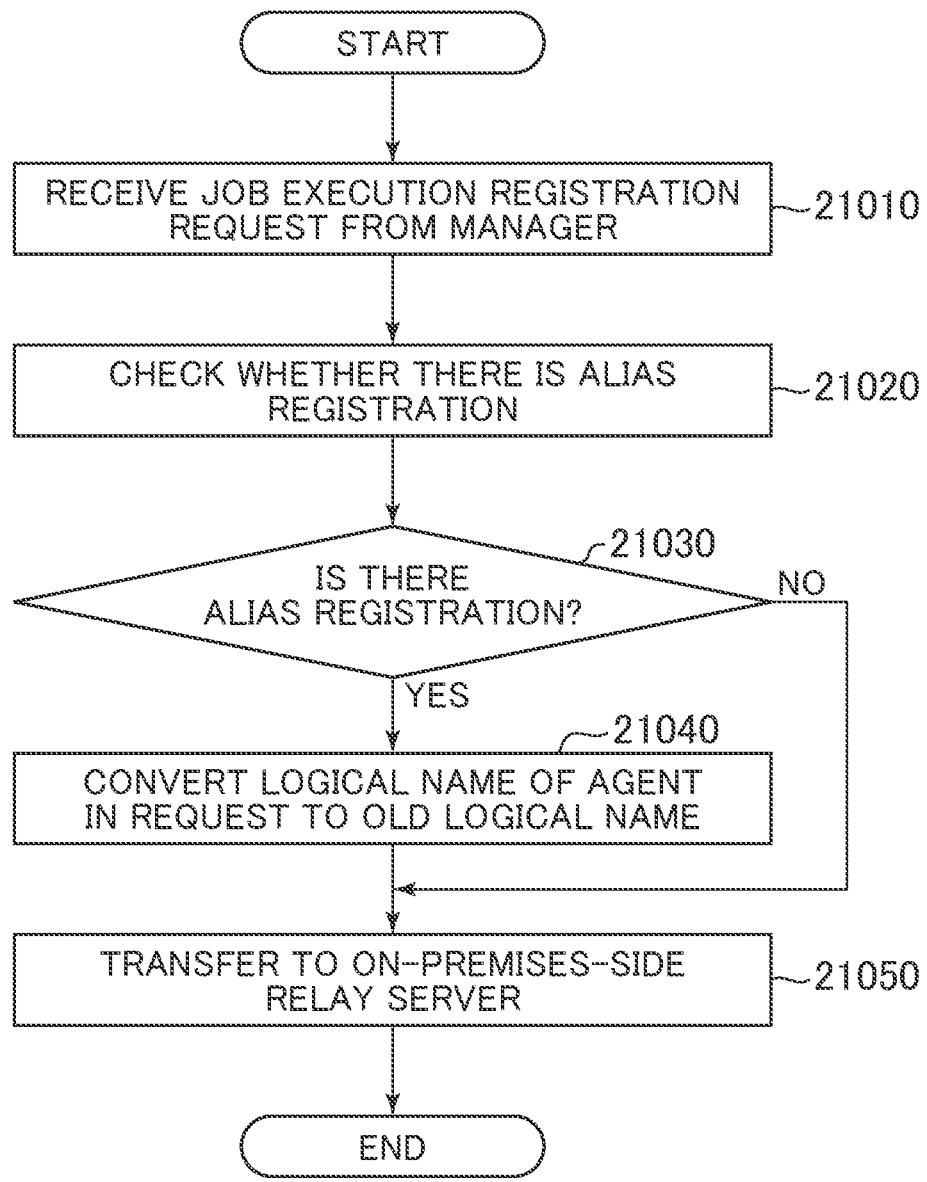
FIG. 21 is a flowchart of the job execution registration processing section of the cloud-side relay server according to the third embodiment.

FIG. 21 is a flowchart depicting operation performed at the job execution registration processing section of the cloud-side relay server 1240 at time of job execution registration request reception.

First, the job execution registration processing section 6210 receives a job execution registration request from the job management manager server 1130 (21010).

Next, the logical name mapping table is searched in accordance with a site name, and agent logical name included in the request, and it is checked whether or not there is registration under an alias (21020).

In a case that there is registration under an alias, the logical name of the execution agent in the job execution registration request is changed to an old logical name described in the logical name mapping table (21040). Otherwise, no processes are performed. Last, the job execution registration request is transferred to the on-premises-side relay server 1140.

A process performed at the job execution registration processing section of the cloud relay server 1240 at time of job execution registration request reception has been explained thus far.

Figure 22:
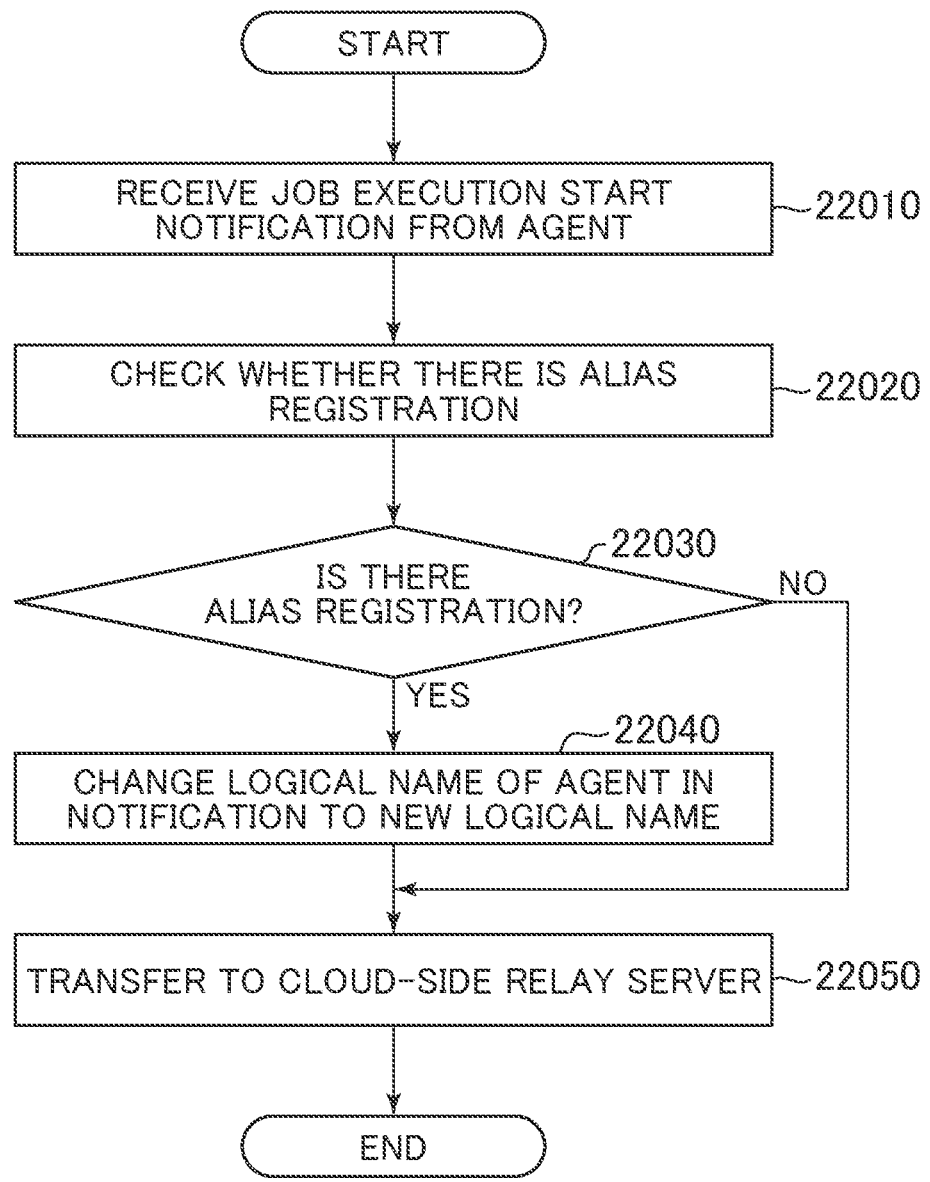
FIG. 22 is a flowchart of the job execution start notification processing section of the on-premises-side relay server according to the third embodiment.

FIG. 22 is a flowchart depicting operation performed at the job execution start notification processing section 9220 of the on-premises-side relay server 1140 at time of job execution start notification reception.

First, the job execution start notification processing section 9220 receives a job execution start notification from the job management agent server 1130 (22010).

Next, the logical name mapping table 17000 is referred to, and it is checked whether or not there is registration under an alias (22020). In a case that there is registration under an alias, the agent logical name in the job execution start notification is changed to a new logical name (22040). Otherwise, no processes are performed.

Last, the job execution start notification is transferred to the cloud relay server 1240.

A process performed at the job execution start notification processing section of the cloud relay server 1240 at time of a job execution start notification reception has been explained thus far.

Operation of receiving a job execution completion notification at the job execution completion notification processing section 9230 of the on-premises-side relay server 1140 is almost similar to the job execution start notification processing section 9220. The difference is whether the process is performed on a job execution start notification or the process is performed on a job execution completion notification.

Figure 23:
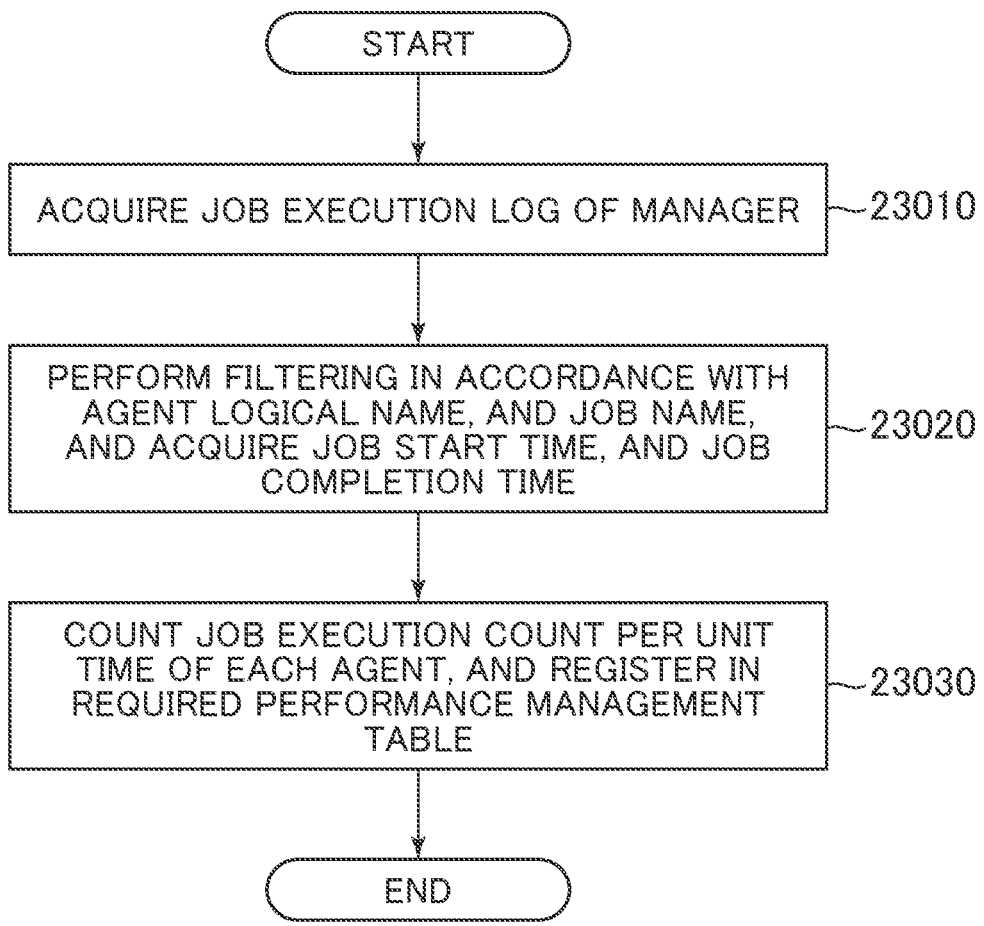
FIG. 23 is a flowchart of required performance management table creation of the portal server according to the third embodiment.

FIG. 23 is a flowchart depicting a method of creating the required performance management table 19000 performed at the portal server 1220.

The portal server 1220 acquires a job execution log of the job management manager server (23010).

Next, filtering is performed in accordance with an agent logical name, and a job name, and a job start time, and a job completion time are acquired (23020).

Last, a job execution count per unit time of each agent is counted, and is registered in the required performance management table 19000 (23030).

A process of the required performance management table creation of the portal server 1220 has been explained thus far.

In addition, in a case that there are no past records at time of the required performance management table creation, initially, an estimate value of a job execution count per unit time made by a manager may be used, and may be written over by a job execution count per unit time calculated at the process of FIG. 23 after the operation is started.

According to the present third embodiment, in a multi-on-premises environment also, a job execution registration request, a job execution start notification, and a job execution completion notification can be transferred securely by using the relay server over the Internet, and can be transferred to an appropriate agent or manager by checking an agent logical name or manager logical name. As a result, secure job execution over the Internet becomes possible. Furthermore, it becomes unnecessary for the relay server to rewrite an agent logical name of an agent that is required of high performance, and the performance requirement can be satisfied.

Fourth Embodiment

The configuration of the job scheduler system according to the present fourth embodiment is almost similar to the third embodiment, but the portal server includes a job net schedule management table, and a job execution time management table. Furthermore, there is a required performance table creation processing section in the portal server. In addition, the agent managing section performs a different process.

A job net schedule management table 24000 in the portal server 1220 is explained by using FIG. 24.

The job net schedule management table 24000 includes fields of start times 24010 retaining start times of job nets, and fields of job net names 24020 retaining job net names of job nets to be executed.

A job execution time management table 25000 in the portal server 1220 is explained by using FIG. 25.

The job execution time management table 25000 includes fields of execution agent logical names 25010 retaining logical names of agents to execute jobs, fields of job names 25020 retaining job names of the jobs to be executed by the agents, and fields of execution time 25030 retaining execution time of the jobs.

Figure 26:
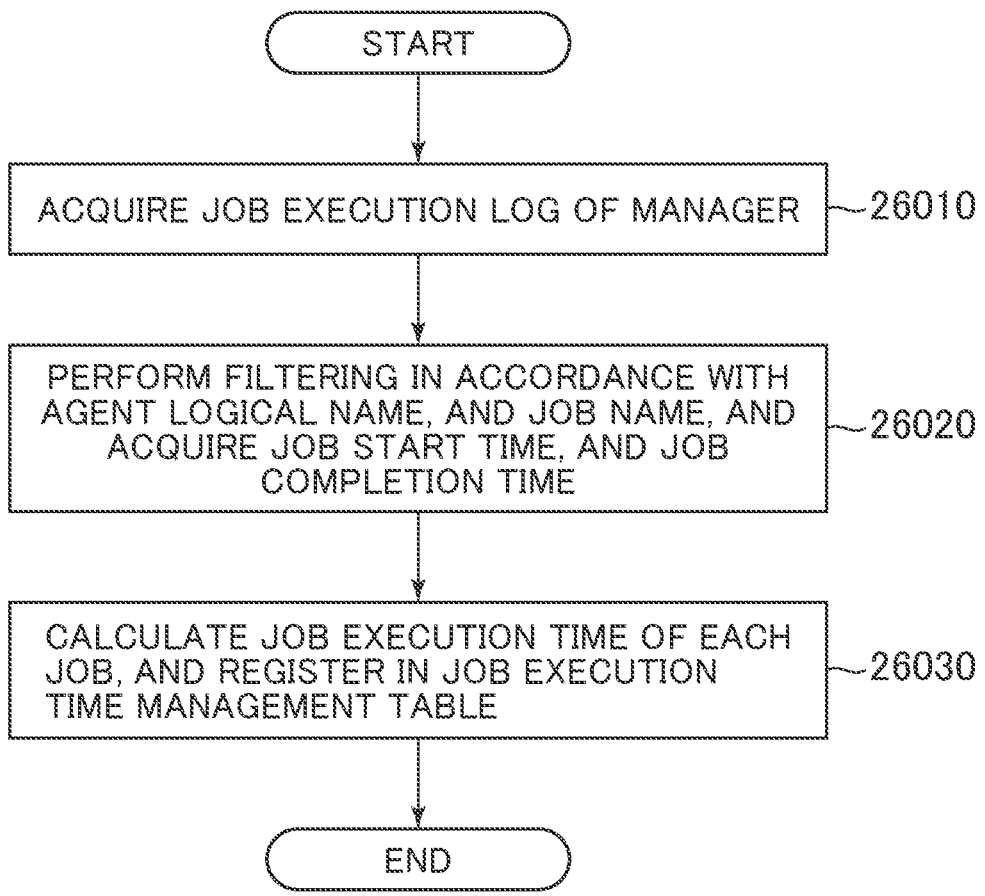
FIG. 26 is a flowchart of a job execution time management table creation process of the portal server according to the fourth embodiment.

FIG. 26 is a flowchart depicting a method of creating the job execution time management table 25000 performed at the portal server 1220.

The portal server 1220 acquires a job execution log of the job management manager server 1230 (26010).

Next, filtering is performed in accordance with an agent logical name, and a job name, and a job start time, and a job completion time are acquired (26020).

Last, job execution time is calculated from the job start time, and job end time of each job, and registers the job execution time in the job execution time management table 25000 (26030).

A process of the job execution time management table creation of the portal server 1220 has been explained thus far.

Figure 27:
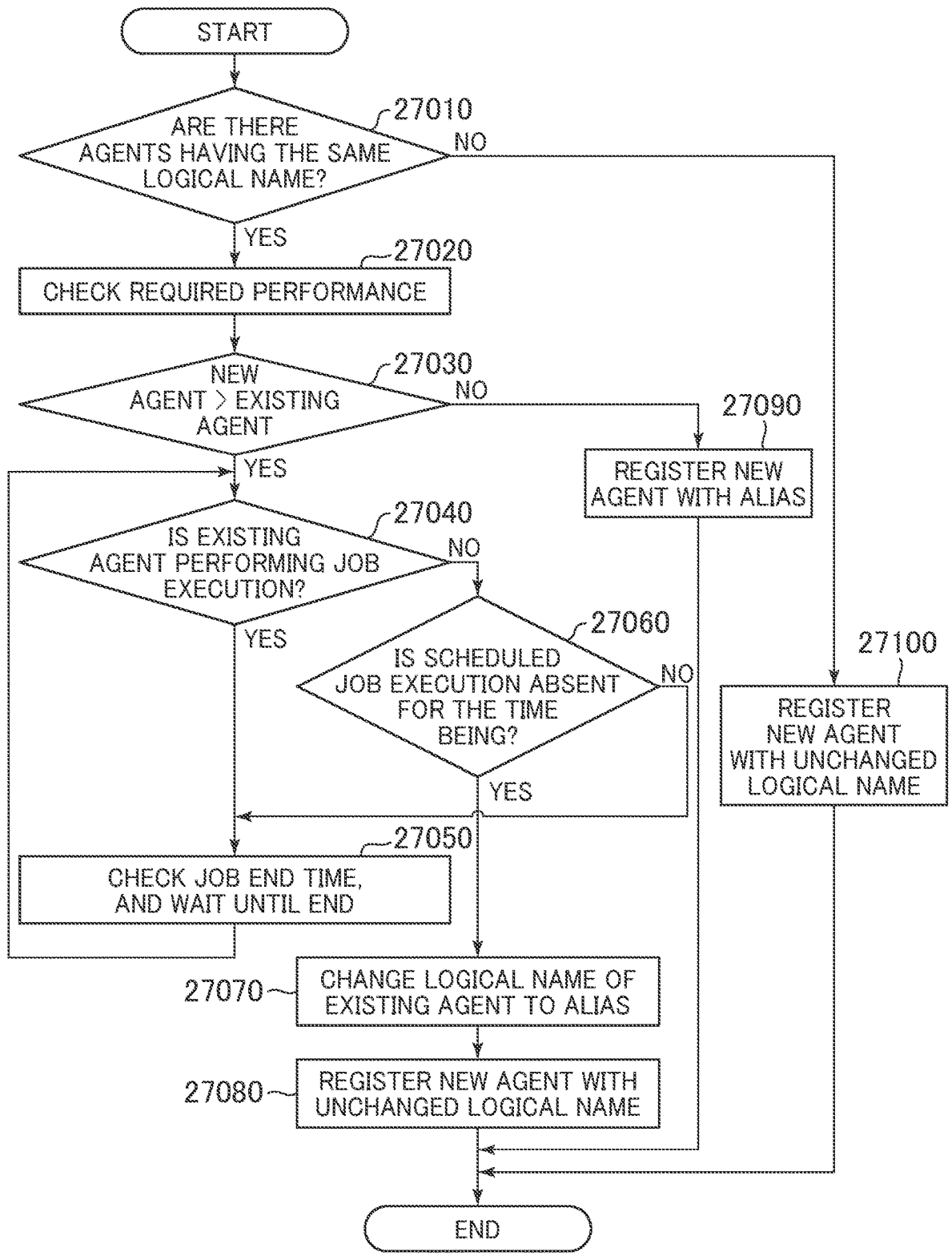
FIG. 27 is a flowchart of the agent registration process of the portal server according to the fourth embodiment.

FIG. 27 is a flowchart depicting the agent registration process performed at the agent managing section 2210 at the portal server 1220.

First, upon reception of an agent registration request, the agent managing section 2210 checks the logical name management table 2110 whether there is the same logical name (27010).

If there is an agent with the same logical name, the required performance is checked (27020, and 27030). If the performance required of an agent to be newly registered is higher than the performance required of the existing agent, it is checked whether or not the existing agent is executing a job (27040).

If the existing agent is executing a job, the job end time is checked in the job execution time management table, the process waits until the job ends, and returns to the process (27040) of checking whether or not the existing agent is executing a job.

In a case that it is determined that the existing agent is not executing a job (27040), the job net schedule management table 24000, and the job execution time management table 25000 are checked to find whether no jobs are to be executed for a while (e.g. five minutes) (27060).

In a case that no jobs are to be executed for a while, the name of the existing registered agent is changed to an alias created by combining a site name, and an agent logical name (27070). Furthermore, the agent to be newly registered is registered under an agent logical name (27080).

On the contrary, in a case that the performance required of the existing agent is higher in the comparison of required performance (27030), the new agent is registered under an alias created by combining a site name, and an agent logical name (27090). In addition, still on the contrary, in a case that there are no agents with the same logical name in the comparison regarding agents with the same logical name (27010), the new agent is registered under an agent logical name with no changes being made thereto (27100).

The agent registration process performed at the agent managing section 2210 of the portal server 1220 has been explained thus far.

According to the present fourth embodiment, in a multi-on-premises environment also, a job execution registration request, a job execution start notification, and a job execution completion notification can be transferred securely by using the relay server over the Internet, and can be transferred to an appropriate agent or manager by checking an agent logical name or manager logical name. As a result, secure job execution over the Internet becomes possible. Furthermore, it becomes unnecessary for the relay server to rewrite an agent logical name of an agent that is required of high performance, and the performance requirement can be satisfied. Furthermore, it is possible to eliminate errors due to unmatching agent names in a job execution start notification or a job execution completion notification at the manager server caused by changes in agent logical names during job execution.

Fifth Embodiment

The configuration of the job scheduler system according to the present fifth embodiment is almost similar to the fourth embodiment, but is different in that the agent managing section of the portal server performs a different process.

Figure 28:
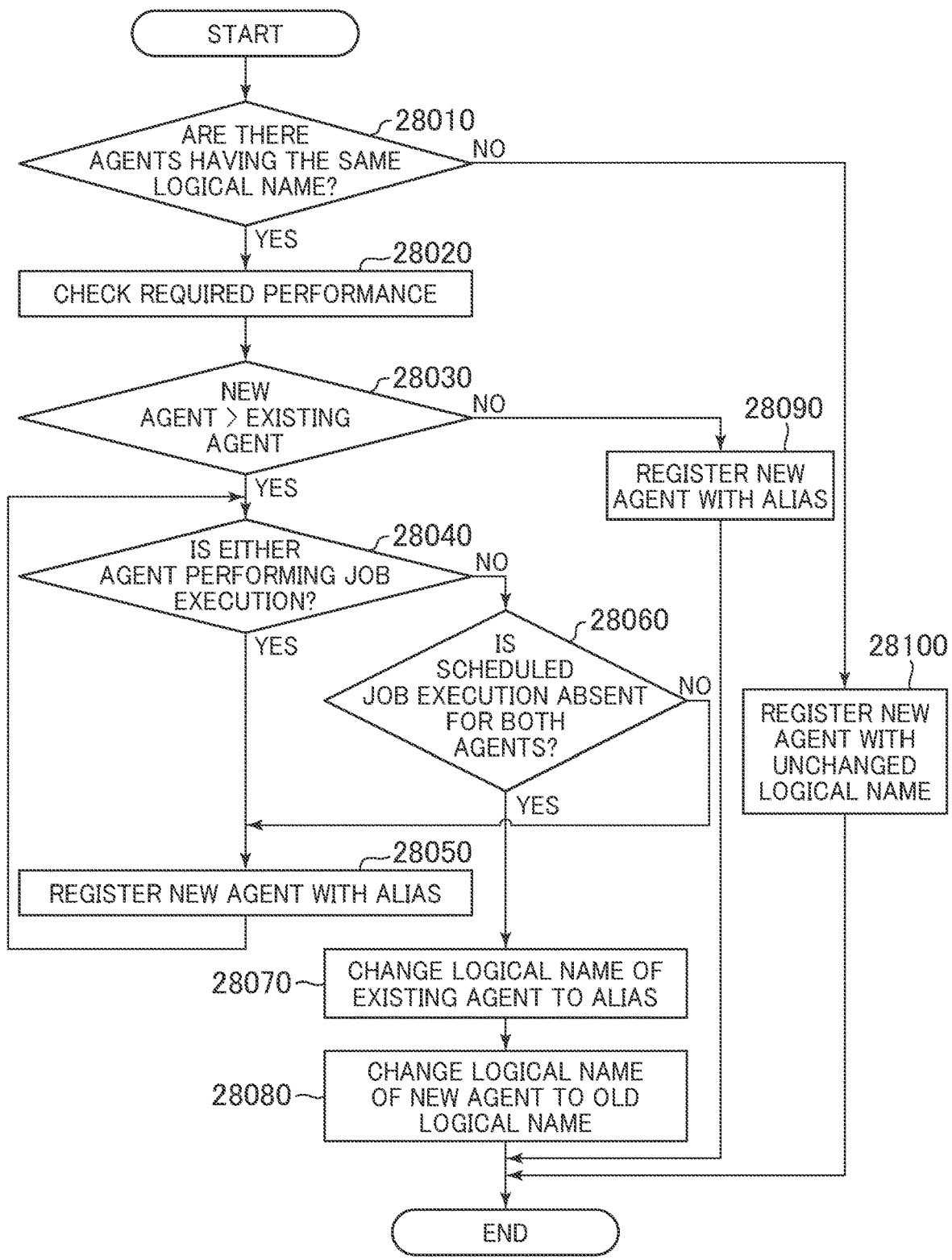
FIG. 28 is a flowchart of the agent registration process of the portal server according to a fifth embodiment.

FIG. 28 is a flowchart depicting the agent registration process performed at the agent managing section 2210 at the portal server 1220.

First, upon reception of an agent registration request, the agent managing section 2210 checks the logical name management table 2110 whether there is the same logical name (28010).

If there is an agent with the same logical name, the required performance is checked (28020, and 28030). If the performance required of an agent to be newly registered is higher than the performance required of the existing agent, it is checked whether or not the agent to be newly registered or existing agent is executing a job (28040).

If both agents are executing jobs, the agent to be newly registered is registered under an alias created by combining a site name, and an agent logical name (28050).

In a case that it is determined that the existing agent is not executing a job (28040), the job net schedule management table 24000, and the job execution time management table 25000 are checked to find whether jobs of the existing agent, and the new agent are not to be executed for a while (e.g. five minutes) (28060).

In a case that no jobs are to be executed for a while, the name of the existing registered agent is changed to an alias created by combining a site name, and an agent logical name (27070). Furthermore, the agent logical name of the agent to be newly registered used as the alias for the registration is changed to the original agent logical name (28080).

On the contrary, in a case that the performance required of the existing agent is higher in the comparison of required performance (28030), the new agent is registered under an alias created by combining a site name, and an agent logical name (28090).

In addition, still on the contrary, in a case that there are no agents with the same logical name in the comparison regarding agents with the same logical name (27010), the new agent is registered under an agent logical name with no changes being made thereto (28100).

The agent registration process performed at the agent managing section 2210 of the portal server 1220 has been explained thus far.

According to the present fifth embodiment, in a multi-on-premises environment also, a job execution registration request, a job execution start notification, and a job execution completion notification can be transferred securely by using the relay server over the Internet, and can be transferred to an appropriate agent or manager by checking an agent logical name or manager logical name. As a result, secure job execution over the Internet becomes possible.

Furthermore, it becomes unnecessary for the relay server to rewrite an agent logical name of an agent that is required of high performance, and the performance requirement can be satisfied. Furthermore, by changing the logical name of the new agent during job execution, it is possible to promptly implement the agent registration, and furthermore it is possible to optimize agent logical names such that performance can be ensured at an appropriate timing.

What is claimed is:

1. A job execution system in which an on-premises side, and a cloud side are connected via the Internet, wherein
the on-premises side has:
an on-premises-side DNS server that performs name resolution;
at least one job execution server that executes a job;
at least one job management agent server that gives an execution instruction about the job of the job execution server; and
an on-premises-side relay server that transfers a job execution registration notification, a job start notification or a job completion notification, the cloud side has:
a cloud-side DNS server that performs name resolution;
a portal server that accepts agent registration or job net registration;
a job management manager server that manages an execution schedule of the job, and transmits the job execution registration notification, the job start notification or the job completion notification to the job management agent server; and
a cloud-side relay server that transfers the job execution registration notification, the job start notification or the job completion notification, at time of job execution registration:
a connection is established between the on-premises-side relay server and the cloud-side relay server;
the job management manager server changes name resolution at the cloud-side DNS server to thereby change communication directed to the job management agent server to communication directed to the cloud-side relay server, and transmit the job execution registration notification to the cloud-side relay server;
the cloud-side relay server transfers the job execution registration notification to the on-premises-side relay server; and
the on-premises-side relay server manages an agent IP address of the job management agent server, and transfers the job execution registration notification to the agent IP address, at time of job start, and job completion:
a connection is established between the on-premises-side relay server and the cloud-side relay server;
name resolution is changed at the on-premises-side DNS server to thereby change communication directed to the job management manager server to communication directed to the on-premises-side relay server, and transmit the job start notification, and job completion notification to the on-premises-side relay server;
the on-premises-side relay server transfers the job start notification, and the job completion notification to the to the cloud-side relay server; and
the cloud-side relay server manages a manager IP address of the job management manager server, and transfers the job start notification, and job completion notification to the manager IP address.

2. The job execution system according to claim 1, wherein
the on-premises-side relay server has an on-premises-side logical name management table retaining logical names of the job management manager server, and the job management agent server, the manager IP address, and the agent IP address,
the cloud-side relay server has a cloud-side logical name management table retaining the logical names of the job management manager server, and the job management agent server, the manager IP address, and the agent IP address,
the portal server has a portal logical name management table retaining the logical name of the job management agent server, the agent IP address, an IP address of the cloud-side relay server, and an IP address of the on-premises-side relay server, and
the on-premises-side logical name management table, the cloud-side logical name management table, and the portal logical name management table are used to transfer the job execution registration notification, the job start notification or the job completion notification.

3. The job execution system according to claim 1, wherein
the on-premises side has a plurality of sites,
each of a plurality of the sites has the on-premises-side DNS server, the job execution server, the job management agent server, and the on-premises-side relay server,
the cloud-side relay server has a cloud-side logical name mapping table retaining a site name of the site, old logical names of the job management manager server, and the job management agent server, and new logical names of the job management manager server, and the job management agent server,
the new logical name of the job management agent server includes a combination of the old logical name of the job management agent server, and the site name,
the on-premises-side relay server has an on-premises-side logical name mapping table retaining the old logical names of the job management manager server, and the job management agent server, and the new logical names of the job management manager server, and the job management agent server,
the portal server has a portal logical name mapping table retaining the site name of the site, the old logical names of the job management manager server, and the job management agent server, and the new logical names of the job management manager server, and the job management agent server, and
the cloud-side logical name mapping table, the on-premises-side logical name mapping table, and the portal logical name mapping table are used to transfer the job execution registration notification, the job start notification or the job completion notification.

4. The job execution system according to claim 3, wherein
at time of the job execution registration, the cloud-side relay server changes the new logical names to the old logical names, and transfers the job execution registration notification to the on-premises-side relay server, and
at time of the job start notification, and the job completion notification, the on-premises-side relay server changes the old logical names to the new logical names, and transfers the job start notification, and the job completion notification to the cloud-side relay server.

5. The job execution system according to claim 3, wherein
the portal server further has a required performance management table retaining the site name of the site, the old logical name of the job management agent server, and performance required of the job management agent server,
the portal server checks whether there are job management agent servers having the same old logical name, and, in a case that there are job management agent servers having the same old logical name, checks performance required of the job management agent servers having the same old logical name, registers, under an old logical name, a job management agent server which is required of the highest performance, and registers, under new logical names, other job management agent servers, and
the required performance management table is used to transfer the job execution registration notification, the job start notification or the job completion notification.

6. The job execution system according to claim 5, wherein
the portal server
acquires a job execution log of the job management manager server; and
counts a job execution count per unit time of each job management agent server on a basis of the job execution log, and registers, as the required performance, the job execution count in the required performance management table.

7. A job execution method for job execution via the Internet, the job execution method having:
a step of setting an IP address of a cloud-side relay server to an IP address of a job management agent server in name resolution;
a step of setting an IP address of an on-premises-side relay server to an IP address of a job management manager server;
a step of setting a permanent connection environment in which a connection is established from the on-premises-side relay server to the cloud-side relay server;
a step of choosing, at the cloud-side relay server, a logical name of the job management manager server included in a job execution start notification or a job execution completion notification, and an IP address of the job management manager server to be a transfer destination from a logical name management table;
a step of transferring the job execution start notification or the job execution completion notification to the job management manager server;
a step of choosing, at the on-premises-side relay server, the logical name of the job management agent server included in a job execution registration request, and an IP address of the job management agent server to be a transfer destination from the logical name management table; and
a step of transferring the job execution registration request to the job management agent server.

8. The job execution method according to claim 7, further having:
a step of registering, in a portal server, a new logical name including a combination of a site name, and an agent logical name at time of agent registration;
a step of changing an agent logical name included in a job net to a new logical name included in a logical name mapping table at time of job net import;
a step of changing an agent logical name included in the job execution registration request to an old logical name at the cloud-side relay server; and
a step of changing the agent logical name included in a job execution start notification or a job execution completion notification to the new logical name at the on-premises-side relay server.

9. The job execution method according to claim 8, further having:
a step of checking performance required of agents in a case that there are agents having the same logical name at time of the agent registration at the portal server;
a step of registering a logical name of an agent which is required of the highest performance without changing the logical name; and
a step of registering, under new logical names, logical names of agents other than the agent which is required of the highest performance.

10. The job execution method according to claim 8, further having:
a step of checking whether there is registration under an alias of an agent logical name when the job execution registration request is processed at the cloud-side relay server; and a step of changing an agent logical name in the job execution registration request to an old logical name in a case that there is registration under an alias.

11. The job execution method according to claim 8, further having:
 a step of checking whether there is registration under an alias of an agent logical name when the job execution start notification, and the job execution completion notification are processed at the on-premises-side relay server; and
 a step of changing an agent logical name included in the job execution start notification, and the job execution completion notification to a new logical name in a case that there is registration under an alias.

12. The job execution method according to claim 9, further having:
 a step of acquiring a past job execution log from the job management manager server when the required performance is created;
 a step of performing filtering in accordance with the agent logical name, and a job name, and extracting an execution start time, and an execution completion time of a job; and
 a step of counting a job execution count of each agent.

13. The job execution method according to claim 9, further having:
 a step of calculating job execution time from a job execution log of the job management manager server at the portal server;
 a step of checking whether there is an agent having the same logical name, and registering a new agent under a logical name with no changes being made thereto in a case that there are no agents having the same logical name;
 a step of checking required performance in a case that there is an agent having the same logical name, and registering the new agent under the new logical name in a case that performance required of an existing agent is higher than performance required of the new agent;
 a step of checking whether the existing agent is executing a job in a case that the performance required of the new agent is higher than the performance required of the existing agent;
 a step of checking whether there is scheduled job execution in a predetermined period even in a case that no jobs are being executed; and
 a step of changing a name of the existing agent to a new logical name in a case that no jobs are being executed, and additionally there is not scheduled job execution in the predetermined period, and registering the new agent under a logical name with no changes being made thereto.

14. The job execution method according to claim 9, further having:
 a step of calculating job execution time from a job execution log of the job management manager server at the portal server;
 a step of checking whether there is an agent having the same logical name, and registering a new agent under a logical name with no changes being made thereto in a case that there are no agents having the same logical name;
 a step of checking required performance in a case that there is an agent having the same logical name, and registering a new agent under a new logical name in a case that performance required of an existing agent is higher than performance required of the new agent;
 a step of checking whether either the existing agent or the new agent is executing a job at in a case that the performance required of the new agent is higher than the performance required of the existing agent;
 a step of checking whether there is scheduled job execution in a predetermined period even in a case that no jobs are being executed;
 a step of registering the new agent under the new logical name in a case that a job is being executed or there is scheduled job execution in the predetermined period; and
 a step of changing a name of the existing agent to a new logical name in a case that no jobs are being executed, and additionally there is not scheduled job execution in the predetermined period, and changing the new logical name of the new agent to an old logical name.

\* \* \* \* \*